(12) United States Patent
Modak et al.

(10) Patent No.: US 10,477,767 B2
(45) Date of Patent: Nov. 19, 2019

(54) DRAPER PLATFORM WITH REMOVABLE CENTRAL ROLLER BAFFLE

(71) Applicant: Deere and Company, Moline, IL (US)

(72) Inventors: Shreyas P. Modak, Thane (IN); Duane M. Bomleny, Geneseo, IL (US); Daniel S. Hoffman, Bettendorf, IA (US); Bryan R. Yanke, Eldridge, IA (US)

(73) Assignee: Deere & Company, Moline, IL (US)

( * ) Notice: Subject to any disclaimer, the term of this patent is extended or adjusted under 35 U.S.C. 154(b) by 44 days.

(21) Appl. No.: 15/663,695

(22) Filed: Jul. 28, 2017

(65) Prior Publication Data

US 2019/0029180 A1 Jan. 31, 2019

(51) Int. Cl.
| | |
|---|---|
| *A01D 61/00* | (2006.01) |
| *A01D 61/02* | (2006.01) |
| *A01D 41/14* | (2006.01) |
| A01D 34/04 | (2006.01) |

(52) U.S. Cl.
CPC ......... *A01D 61/008* (2013.01); *A01D 41/142* (2013.01); *A01D 61/004* (2013.01); *A01D 61/02* (2013.01); *A01D 34/04* (2013.01); *A01D 41/14* (2013.01)

(58) Field of Classification Search
CPC .... A01D 61/002; A01D 41/14; A01D 61/008; A01D 57/20; A01D 61/02; A01D 41/06; A01D 41/142; A01D 61/004; A01D 34/04
See application file for complete search history.

(56) References Cited

U.S. PATENT DOCUMENTS

| | | | |
|---|---|---|---|
| 4,487,004 A | 12/1984 | Kejr | |
| 4,597,510 A | 7/1986 | Durant | |
| 4,956,966 A * | 9/1990 | Patterson | ............... A01D 41/14 56/181 |

(Continued)

FOREIGN PATENT DOCUMENTS

FR 1415334 10/1965

OTHER PUBLICATIONS

Westfield, MKX Series Augers, brochure,http://www.grainaugers.com/site/assets/files/518625/2016_wf mkx_series_brochure.pdf (2016).

(Continued)

*Primary Examiner* — Arpad Fabian-Kovacs
(74) *Attorney, Agent, or Firm* — Rathe Lindenbaum LLP

(57) ABSTRACT

A draper platform for mounting on a feeder house of an agricultural combine may include a frame, a center belt conveyor to carry cut crop material rearwardly towards a center opening in the frame through which crop may be fed into a feeder house, a left side belt conveyor to carry cut crop material to the center belt conveyor, a right side belt conveyor to carry cut crop material to the center belt conveyor, at least one elongate reciprocating knife assembly extending along a front edge of each of the center belt conveyor, the left side belt conveyor and the right side belt conveyor, a left side top cross auger above the left side belt conveyor, the left side top cross auger having a right inner end, a right side top cross auger above the right side belt conveyor, the right side top cross auger having a left inner end opposite to and spaced from the right inner end and a conveyor drum above the center belt conveyor below a space between the right inner end and the left inner end.

17 Claims, 23 Drawing Sheets

(56) References Cited

U.S. PATENT DOCUMENTS

| | | | |
|---|---|---|---|
| 5,005,343 A * | 4/1991 | Patterson | A01D 41/14 56/14.4 |
| 6,564,535 B1 | 5/2003 | Nafziger et al. | |
| 6,640,527 B2 | 11/2003 | Farley et al. | |
| 7,587,885 B2 | 9/2009 | Tippery et al. | |
| 7,971,420 B1 * | 7/2011 | Bollin | A01D 41/145 56/208 |
| 8,166,738 B1 * | 5/2012 | Coers | A01D 61/002 56/181 |
| 2008/0295474 A1 | 12/2008 | Tippery et al. | |
| 2013/0008142 A1 | 1/2013 | Dow et al. | |
| 2014/0041354 A1 | 2/2014 | Coon et al. | |
| 2014/0237979 A1 | 8/2014 | Yanke et al. | |
| 2015/0195992 A1 | 7/2015 | Corum et al. | |
| 2016/0242358 A1 * | 8/2016 | Mossman | A01D 61/008 |
| 2016/0295800 A1 * | 10/2016 | Allochis | A01D 34/14 |
| 2016/0360699 A1 * | 12/2016 | Allochis | A01D 43/06 |
| 2016/0360701 A1 * | 12/2016 | Weeks | A01D 61/008 |
| 2017/0208738 A1 * | 7/2017 | McCrea | A01D 34/14 |
| 2018/0054962 A1 * | 3/2018 | Fredricks | A01D 34/44 |
| 2018/0054964 A1 * | 3/2018 | Fuchtling | B65G 43/00 |

OTHER PUBLICATIONS

European Search report for 18185775.6-1006/3434096 dated Apr. 23, 2019.
European Search report for 18185775.6-1006 dated Dec. 14, 2018.

* cited by examiner

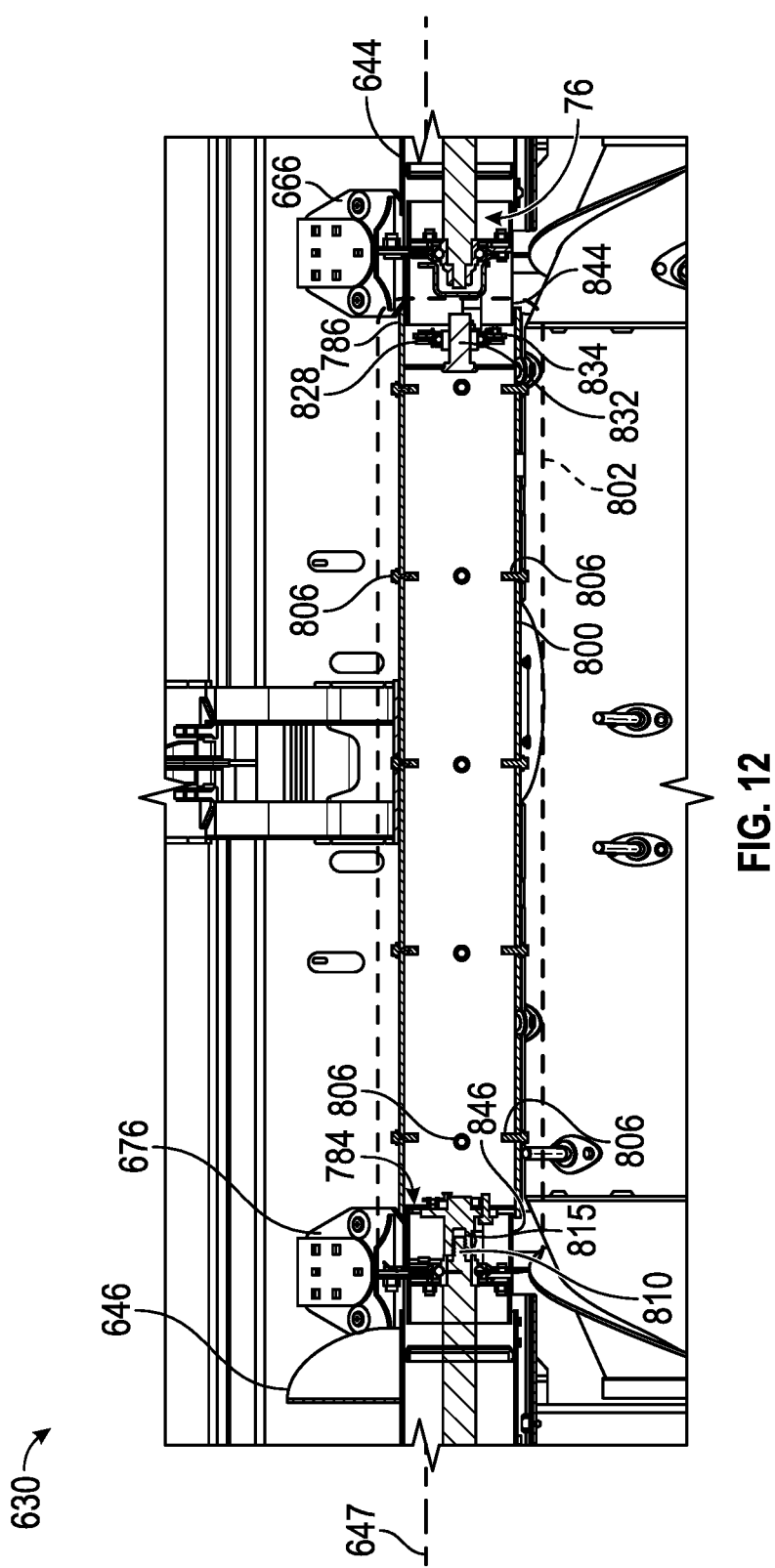

DRAPER PLATFORM WITH REMOVABLE CENTRAL ROLLER BAFFLE

CROSS-REFERENCE TO RELATED PATENT APPLICATIONS

The present application is related to co-pending U.S. patent application Ser. No. 15/663,696 filed on the same day by Shreyas P. Modak et al. and entitled DRAPER PLATFORM WITH RECONFIGURABLE CENTRAL ROLLER BAFFLE, the full disclosure of which is hereby incorporated by reference.

BACKGROUND

Combines, also known as harvesters, are self-propelled vehicles used for harvesting and threshing agricultural crop in a field. Such combines typically utilize a header which initially severs or separates the crop from the underlying growing medium. One type of such a header is a draper platform which severs the crop with a reciprocating knife and which gathers the cut crop onto left and right conveyor belts that convey the cut crop to a central conveyor belt that cooperates with a conveyor drum to direct the cut crop into a feeder house of the combine.

BRIEF DESCRIPTION OF THE DRAWINGS

FIG. 12 is a sectional view of portions of an example implementation of the draper platform of FIGS. 9 and 10.

Figure 1:
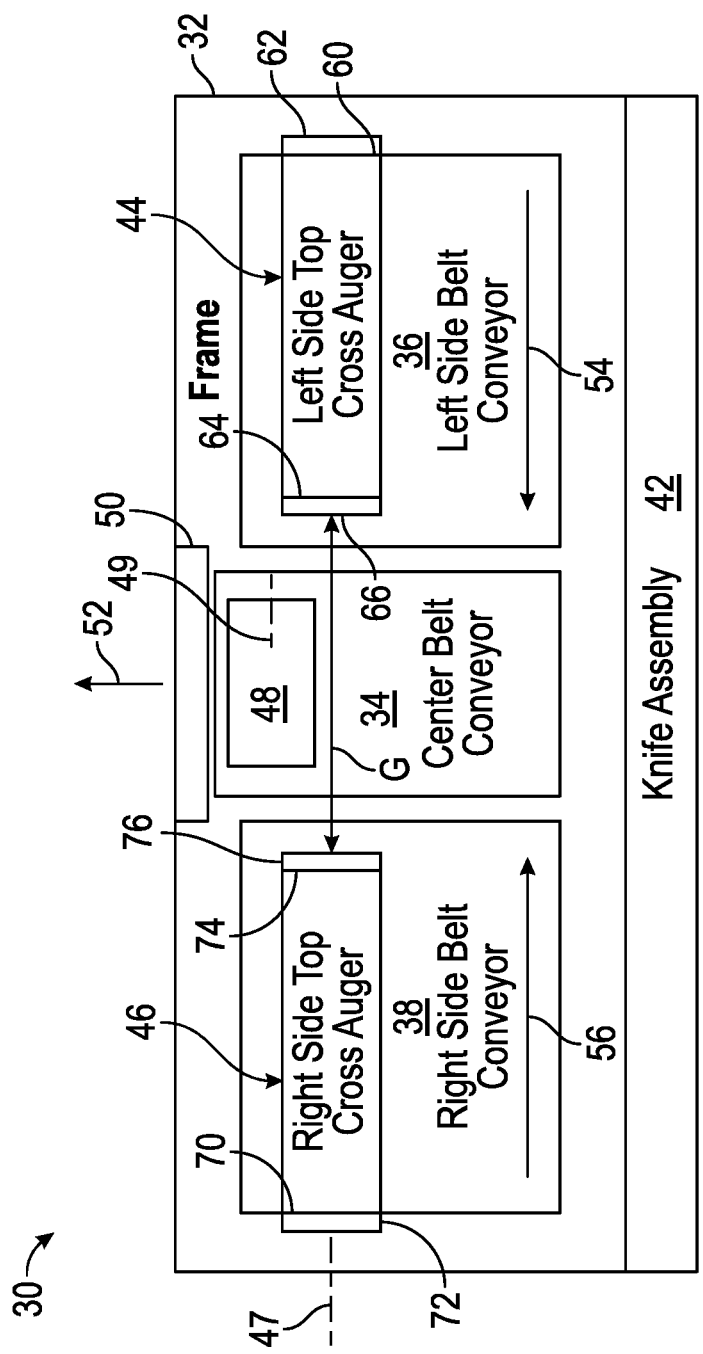
FIG. 1 is a schematic diagram of portions of an example draper platform for a combine.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION OF EXAMPLES

Some draper platforms include a top cross auger in the form of a single elongate tube having oppositely directed exterior veins on opposite sides of the central conveyor so as to further assist in moving cut crops to the central conveyor. In some draper platforms, portions of the tube above the conveyor drum include outwardly projecting tines to assist in directing cut crop material into the feeder house.

Those draper platforms that include such a single top cross auger may not be well-suited for all crop conditions. In some crop conditions, the presence of the top cross auger over the conveyor drum may result in crop loss or crop damage. In some crop conditions, those portions of the existing top cross auger over the conveyor drum that interact with the cut crop may be too aggressive. In other crop conditions, those portions of the existing top cross auger over the conveyor drum that interact with the cut crop may not be sufficiently aggressive.

Disclosed herein is an example draper platform for a combine that provides two separate top cross augers with a central roller baffle above the conveyor drum removably mounted or supported between the two separate top cross augers. As a result, in certain crop conditions, the central roller baffle may be omitted, providing a volume between the two separate top cross augers above the conveyor drum. In other crop conditions, the central roller baffle may be removably mounted between the two separate top cross augers. In some crop conditions, a first central roller baffle that interacts with the crops in a first manner, a first level of aggressiveness, may be removably mounted between the two separate top cross augers. In other crop conditions, a second central roller baffle that interacts with crops in a second different manner, a second different level of aggressiveness, may be removably mounted between the two separate top cross augers. The example draper system provides an operator with the ability to customize crop interaction of the draper platform for different crop conditions by completely removing the central roller baffle or by selecting and removably mounting one of many differently configured central roller baffles between the two top cross augers.

Disclosed herein is an example draper platform for mounting on a feeder house of an agricultural combine, wherein the draper platform may include a frame, a center belt conveyor to carry cut crop material rearwardly towards a center opening in the frame through which crop may be fed into a feeder house, a left side belt conveyor to carry cut crop material to the center belt conveyor, a right side belt conveyor to carry cut crop material to the center belt conveyor, at least one elongate reciprocating knife assembly extending along a front edge of each of the center belt conveyor, the left side belt conveyor and the right side belt conveyor, a left side top cross auger above the left side belt conveyor, the left side top cross auger having a right inner end, a right side top cross auger above the right side belt conveyor, the right side top cross auger having a left inner end opposite to and spaced from the right inner end and a conveyor drum above the center belt conveyor below a space between the right inner end and the left inner end.

Disclosed herein is an example method for adapting a draper platform for a particular crop condition. The method may include supporting a first top cross auger and a second top cross auger in a spaced apart relationship above conveyor belts on a draper platform for a combine and removably mounting a central roller baffle between the two top cross augers above a conveyor drum.

Disclosed herein is an example central roller baffle that may include an elongate crop engaging member extending along an axis for rotation about the axis, the crop engaging member having a first axial end and a second axial end, a first coupler on the first end to releasably mount the first and to an inner end of a first top cross auger and a second coupler on the second end to releasably mount the second end to an inner end of a second top cross auger.

For purposes of this disclosure, the term "coupled" shall mean the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate member being attached to one another. Such joining may be permanent in nature or alternatively may be removable or releasable in nature. The term "operably coupled" shall mean that two members are directly or indirectly joined such that motion may be transmitted from one member to the other member directly or via intermediate members.

For purposes of this disclosure, the term "releasably" or "removably" with respect to an attachment or coupling of two structures means that the two structures may be repeatedly connected and disconnected to and from one another without material damage to either of the two structures or their functioning. For purposes of this disclosure, the phrase "configured to" denotes an actual state of configuration that fundamentally ties the stated function/use to the physical characteristics of the feature proceeding the phrase "configured to".

Figure 2:
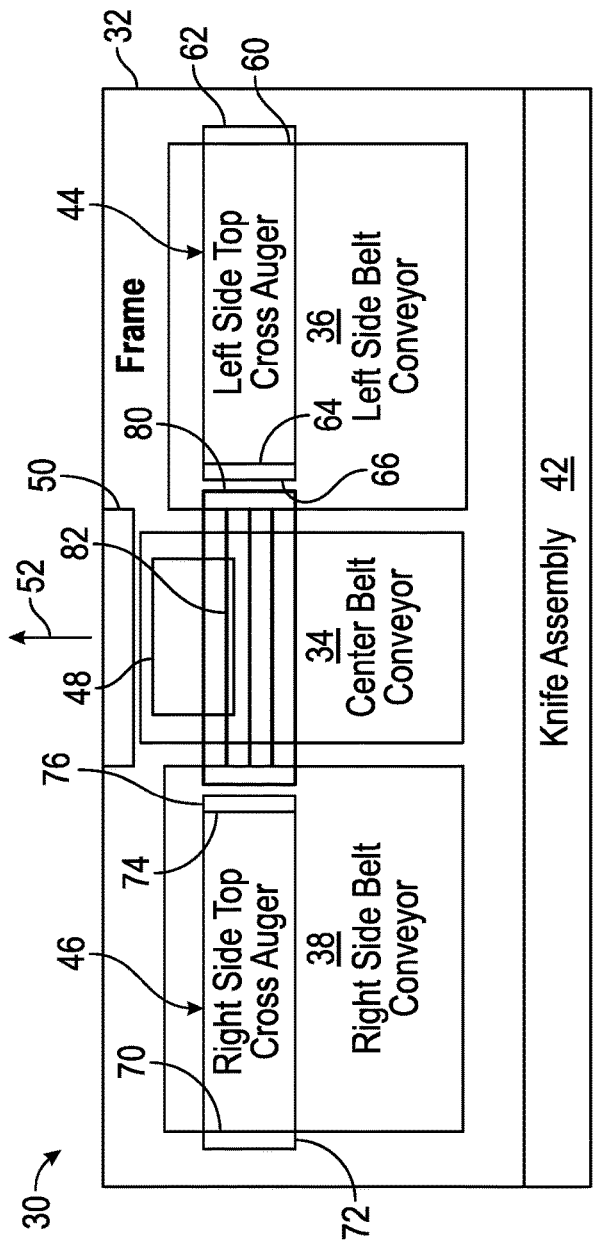
FIG. 2 is a schematic diagram of portions of the example draper platform of FIG. 1 additionally comprising a central roller baffle

FIGS. 1 and 2 are schematic diagrams illustrating portions of an example draper platform 30 for use in a combine harvester. Draper platform 30 provides an operator with the opportunity to customize characteristics of the draper platform depending upon crop conditions by removing or selectively utilizing one of a plurality of different central roller baffles. FIG. 1 illustrates draper platform 30 without a central roller baffle. FIG. 2 illustrate a platform 30 with removably mounted or supported central roller baffle. Draper platform 30 comprises frame 32, center belt conveyor 34, left side belt conveyor 36, right side belt conveyor 38, reciprocating knife assembly 42 left side top cross auger 44, right side top cross auger 46 and conveyor drum 48.

Frame 32 comprises an arrangement of panels, beams, brackets and the like supporting the remaining components of platform 32. Frame 32 is configured to be mounted or coupled to a feeder house of a combine in a permanent or removable fashion. Frame 32 includes a rear center opening 50 through which crop may be fed to the feeder house.

Center belt conveyor 34 comprises an endless conveyor belt situated directly in front of center opening 50 between left side conveyor belt 36 and right side conveyor belt 38, behind knife assembly 42. Center conveyor belt 34 is operably coupled to a source of torque, a rotary drive, that drives center belt conveyor 34 rollers or other support structures so as to carry or convey crop material cut by knife assembly 42 in a rearward direction as indicated by arrow 52 through opening 50 to the feeder house (not shown) of the combine.

Left side conveyor belt 36 extends on the left side of center belt conveyor 34 (as seen from behind draper platform 30). Left side conveyor belt 36 comprises an endless web or conveyor belt operably coupled to a source of torque or rotary drive so as to carry the crop material cut by knife assembly 42 toward center belt conveyor 34 in the direction indicated by arrow 54. Right side conveyor belt 38 extends on the right side of center belt conveyor 34 (as seen from behind draper platform 30). Right side conveyor belt 38 comprises an endless web or conveyor belt operably coupled to a source of torque or rotary drive so as to carry the crop material cut by knife assembly 42 toward center belt conveyor 34 in the direction indicated by arrow 56.

Knife assembly 42 comprises at least one elongate reciprocating knife assembly extending along a front edge of platform 30. Knife assembly 42 cuts or severs the crop from its growing medium. In one implementation, knife assembly 42 comprises a single knife assembly extending across the entire front of platform 30. In other implementations, knife assembly 42 may comprise multiple subsections or sub knife assemblies that collectively extend across the front of platform 30. One example of a knife assembly 42 may comprise a cutter bar and knife guards that guide a reciprocating knife or knife sections. Although not illustrated, in some implementations, platform 30 may additionally include at least one reel that gathers the crop and directs the crop towards knife assembly 42 and onto conveyors 34, 36 and 38.

Left side top cross auger 44 comprises an auger rotatably supported proximate a rear of frame 32 above left side conveyor 36. Left side top cross auger 44 is located on a left side (as seen from behind platform 30) of center belt conveyor 34. Left side top cross auger 44 has opposite end portions that are journaled. Left side top cross auger 44 has an outer end 60 supported by a journal support 62 and an inner journaled end 64 rotatably supported by journal support 66. Journal supports 62 and 66 rotationally support ends 60 and 64 of left side top cross auger, respectively. Journal supports 62 and 66 may comprise bearings and associated bearing races that rotationally support a shaft of left side top cross auger relative to frame 32 above left side conveyor 36.

Right side top cross auger 46 comprises an auger rotatably supported proximate a rear of frame 32 above right side conveyor 38. Left side top cross auger 44 and right side top cross auger 46 are coaxial, configured to be rotatably driven about a single horizontal axis 47. Right side top cross auger 46 is located on a right side (as seen from behind platform 30) of center belt conveyor 34. Right side top cross auger 46 has opposite end portions that are journaled. Right side top cross auger 46 has an outer end 70 supported by a journal support 72 and an inner journaled end 74 rotatably supported by journal support 76. Journal supports 72 and 76 rotationally support ends 70 and 74 of right side top cross auger, respectively. Journal supports 72 and 76 may comprise bearings and associated bearing races that rotationally support a shaft of right side top cross auger relative to frame 32 above left side conveyor 36.

In another implementation, augers 44 and 46 are each rotatable about distinct axes that are oblique to one another. For example, in one implementation, journal supports 66 and 76 rotatably support inner ends 64 and 74 at a greater height above conveyors 36 and 38 than the height at which outer ends the and 70 are rotatably supported by journal supports 62 and 72. As a result, augers 44 and 64 upwardly incline as they approach center belt conveyor 34, accommodating the potentially thicker crop mat near center belt conveyor 34.

Conveyor drum 48 comprises a drum rotatably supported above center belt conveyor 34. Conveyor drum 48 is operably coupled to a source of torque, a rotary drive (not shown) so as to be rotatably driven about a horizontal axis, parallel to the axis 47 about which augers 44 and 46 are rotatably driven. Conveyor drum 48 may include crop engaging elements, such as tines, baffles or the like that cooperate with center belt conveyor 34 to move and direct cut crop in the direction indicated by arrow 52 through opening 50 to the feeder house of the combine. In the example illustrated, conveyor drum 48 is rotatably driven about an axis 49 rearwardly offset from axis 47.

As shown by FIG. 1, journal supports 66 and 76 support ends 64 and 74, respectively, at spaced locations, forming a space or gap G therebetween. The gap G extends directly above conveyor drum 48 and directly above center belt conveyor 34. In the example illustrated, the gap G has a length (in a direction parallel to axis 47) sufficient to receive an elongate central roller baffle. In one implementation, the length of gap G is at least 2 feet. Journal supports 66 and 76 independently support the ends of augers 44 and 46 to facilitate the use of platform 30 with the formed gap G and without any intermediate central roller baffles to accommodate certain crop conditions. Although journal supports 66 and 76 are illustrated at the extreme inner ends of augers 44 and 46, respectively, in other implementations, journal supports 66 and 76 may be located at and support intermediate portions of augers 44 and 46, wherein the extreme inner ends are cantilevered, but are still spaced from one another by gap G.

In response to other crop conditions, an operator may decide to add a central roller baffle to platform 30. FIG. 2 illustrates draper platform 30 further including a central roller baffle 80 removably are releasably mounted above conveyor drum 48 and between left side top cross auger 44 and right side top cross auger 56.

In one implementation, central roller baffle 80 is releasably connected to an end of at least one of augers 44, 46. In one implementation, central roller baffle 80 is releasably connected to the inner end of each of augers 44, 46. In one implementation, central roller baffle 80 is releasably connected to an inner end of one of augers 44, 46 such that torque may be transmitted from the inner end of one of augers 44, 46 to the central roller baffle 80. In one implementation, central roller baffle 80 transmits torque or rotation movement from auger 46 to auger 44 or vice versa. In another implementation, central roller baffle 80 is disconnected and spaced from one inner end of augers 44, 46 are both inner ends of augers 44, 46. In those implementations in which central roller baffle 80 is disconnected and spaced from both inner ends of augers 44, 46, the outer ends of central roller baffle 80 may be independently supported by respective journal structures that rotatably support the opposite ends of central roller baffle 80. In such an implementation, a separate drive mechanism may be operably coupled to central roller baffle 80 to rotate central roller baffle 80.

Central roller baffle 80 may include at least one exterior crop driver 82. Crop driver 82 comprises at least one surface radially or otherwise outwardly projecting in a direction away from the rotational axis of baffle 80 so as to engage and drive crop material in the direction indicated by arrow 52 when being rotatably driven. In one implementation, crop driver 82 may comprise a series of fingers or tines. In another implementation, crop driver 82 may comprise a series of elongated baffle plates facing in directions tangent to the rotational axis of central roller baffle 80 extending parallel to or along the rotational axis of central roller baffle 80. In one implementation, central roller baffle 80 may comprise a cylindrical structure or tube from which such baffle plates project or extend. In another implementation, central roller baffle 80 may comprise a structure wherein multiple baffle plates intersect one another along an intersection line coincident with the rotational axis of central roller baffle 80. In yet another implementation, central roller baffle 80 may comprise a noncircular cross-sectional shape such as a polygonal shape or an oval cross-sectional shape. In yet another implementation, central roller baffle 80 may have an asymmetrical cross-sectional shape, wherein the exterior of central roller baffle 80 comprises bulges and/or depressions that, similar to paddles, drive and engage crop. In yet other implementations, central roller baffle 80 may have other configurations.

In some implementations, crop driver 82 may be integrally formed as a single unitary body. For example, crop driver 82 may comprise a square or rectangular tube, and elliptical tube or the like. Crop driver 82 may comprise fixed tines, plates, baffles or other projections for driving crop.

In some implementations, crop driver 82 may be releasably or removably supported by a central support portion of central roller baffle 80. For example, in one implementation, crop driver 82 may comprise at least one plate which is removably mountable to the exterior of the central support portion of roller baffle 80. In such an implementation, differently configured plates may be interchangeably mounted to the central support portion to provide central roller baffle 80 with different levels of aggressiveness with respect to driving a crop. In one implementation, multiple sets of different plates offering different customized levels of crop driving aggressiveness may be interchangeably mounted to the central support of baffle 80 with the same mounting structures. In some implementations, the at least one plate which is removably mounted to the central support of central roller baffle 80 may be configured such that the orientation in which such plates are mounted to the central support portion impacts the level of aggressiveness central roller baffle 80 has with respect to driving a crop. For example, the same plate may offer a first level of crop driving aggressiveness when in a first orientation and may offer a second greater level of crop aggressiveness when mounted to the central support portion in a second orientation, such as 180° from the first orientation.

In short, draper platform 30 offers a user the ability to change the configuration of draper platform 30 in multiple fashions. Depending upon crop conditions, a user may remove the entire central roller baffle 80. Depending upon crop conditions, user may insert first central roller baffle 80 having a first crop driver 82 offering a first degree of crop driving aggressiveness. If crop conditions change once again, the user may remove the first central roller baffle 80 and insert a second central roller baffle having a second crop driver 82 offering a second degree of crop driving aggressiveness. In some circumstances, the user may leave the central roller baffle 80 in place, but instead remove the current crop driver 82 and mount a different crop driver 82 having a different degree of crop driving aggressiveness.

Figure 3:
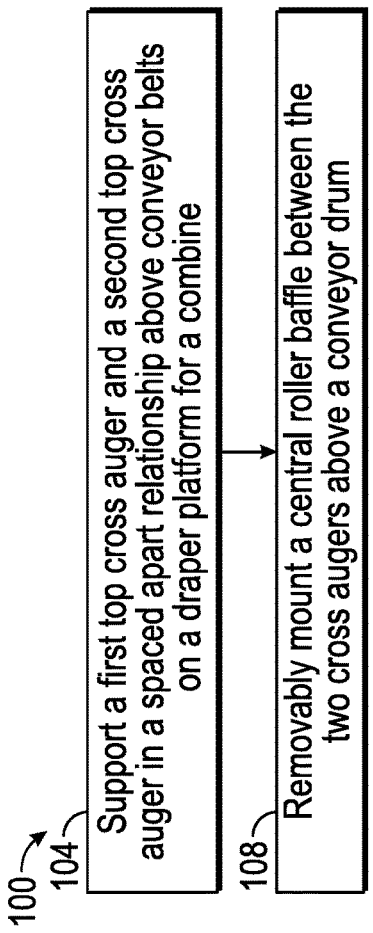
FIG. 3 is a flow diagram of an example method for modifying a combine draper platform.

FIG. 3 is a flow diagram of an example method 100 for customizing or modifying a draper platform. In some circumstances, the gripper platform may be customized modified based upon current crop conditions. By adapting to different crop conditions, the loss of crop or damage to the crop being harvested may be reduced by providing an appropriate degree of crop driving aggressiveness over the conveyor drum 48. Although method 100 is described in the context of modifying draper platform 30, it should be appreciated that method 100 may be carried out with any of the draper platform described hereafter or with any other similar draper platforms.

As indicated by block 104, a first top cross auger and a second top cross auger are supported in a spaced apart relationship above conveyor belts on a draper platform for a combine. As shown by FIGS. 1 and 2, left side top cross auger 44 and right side top cross auger 46 are supported in a spaced apart relationship above conveyor belts 36 and 38. In particular, the inner ends of augers 44, 46 are supported by respective journal structures. As described above, in some implementations, the chosen configuration for draper platform 30 may omit central roller baffle 80.

As indicated by block 108, a central roller baffle may be removably mounted between the two top cross augers above a conveyor drum. In the example shown in FIG. 2, central roller baffle 80 is removably mounted between cross augers 44, 46 above conveyor drum 48. As described above, in some implementations, central roller baffle 80 may be removably connected to one or both of the inner ends of such cross augers 44, 46. In some implementations, one end of central roller baffle 80 may be removably connected to an inner end of one of augers 44, 46 for the transmission of torque while the other end is supported, but does not transmit torque. In some implementations, both ends of the central roller baffle 80 are removably connected to the inner ends of augers 44, 46 for the transmission of torque. In yet other implementations, both ends of central roller baffle 80 are axially spaced from the inner ends of augers 44, 46 and driven by a separate rotary drive.

Figure 4:
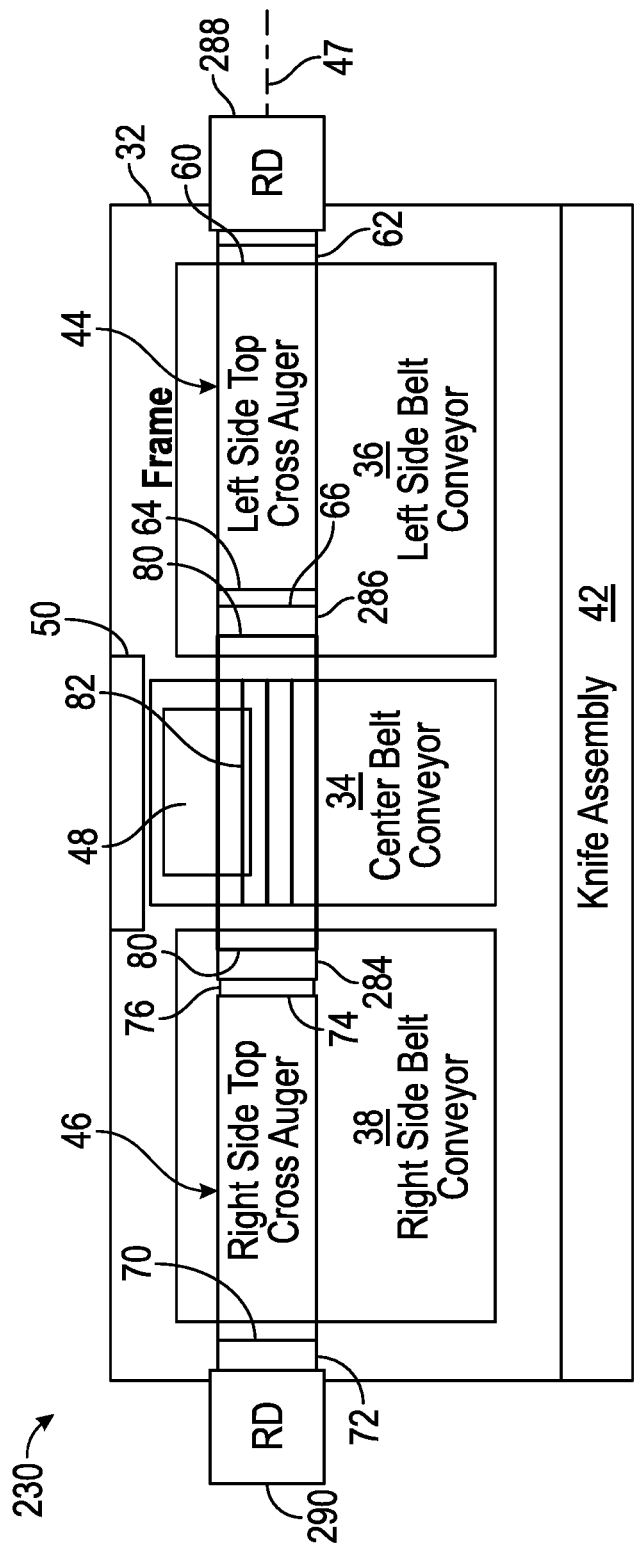
FIG. 4 is a schematic diagram of portions of an example draper platform for a combine.

FIG. 4 is a schematic diagram illustrating portions of an example draper platform 230 for use in a combine harvester. Draper platform 230 is similar to be draper platform 30 described above with respect to FIG. 2, with the removably mounted central roller baffle 80, except that that draper platform 230 is illustrated as specifically additionally comprising torque coupler 284, bearing coupler 286 and rotary drives 288, 290. Those remaining components or structures of draper platform 230 which correspond to structures or components of draper platform 30 are numbered similarly.

Torque coupler 284 comprises an interface between the inner end 74 of auger 46 and the outer end of central roller baffle 80. Torque coupler 284 transmits torque or rotational movement from auger 46 to central roller baffle 80. In one implementation, torque coupler 284 may comprise a threaded shaft extending from one of auger 46 and baffle 80 and a threaded socket extending from the other of auger 46 and baffle 80, wherein the threaded socket receives the threaded shaft such that rotation of auger 46 tightens the threaded connection between the two members. In another implementation, torque coupler 284 may comprise other torque coupling arrangements, such as a gear train, a chain and sprocket arrangement, a belt and pulley arrangement or a noncircular shaft and a noncircular bore providing a keyed relationship for the transmission of torque.

Bearing coupler 286 comprises an interface between the inner end 64 of auger 44 and the outer end of central roller baffle 80. Bearing coupler 286 facilitates relative rotation of auger 44 with respect to central roller baffle 80. In one implementation, bearing coupler 286 may comprise a rotational bearing between auger 44 and baffle 80. In some implementations, bearing coupler 286 may be omitted.

Rotary drives 288, 290 comprise mechanism by which augers 44 and 46 are rotationally driven about axis be seven. In the example illustrated, rotary drive 288 drives left side top cross auger 44 while rotary drive 290 drives right side top cross auger 46. In one implementation, each of such drive 288, 290 has a separate independent source of torque, such as a separate hydraulic motor, electric motor or the like. In other implementations, drive 288, 290 are powered by a same torque source, such as an internal combustion engine or a single hydraulic or electric motor which is connected to each of the rotary drive 280, 290 by a distinct transmission.

Figure 5:
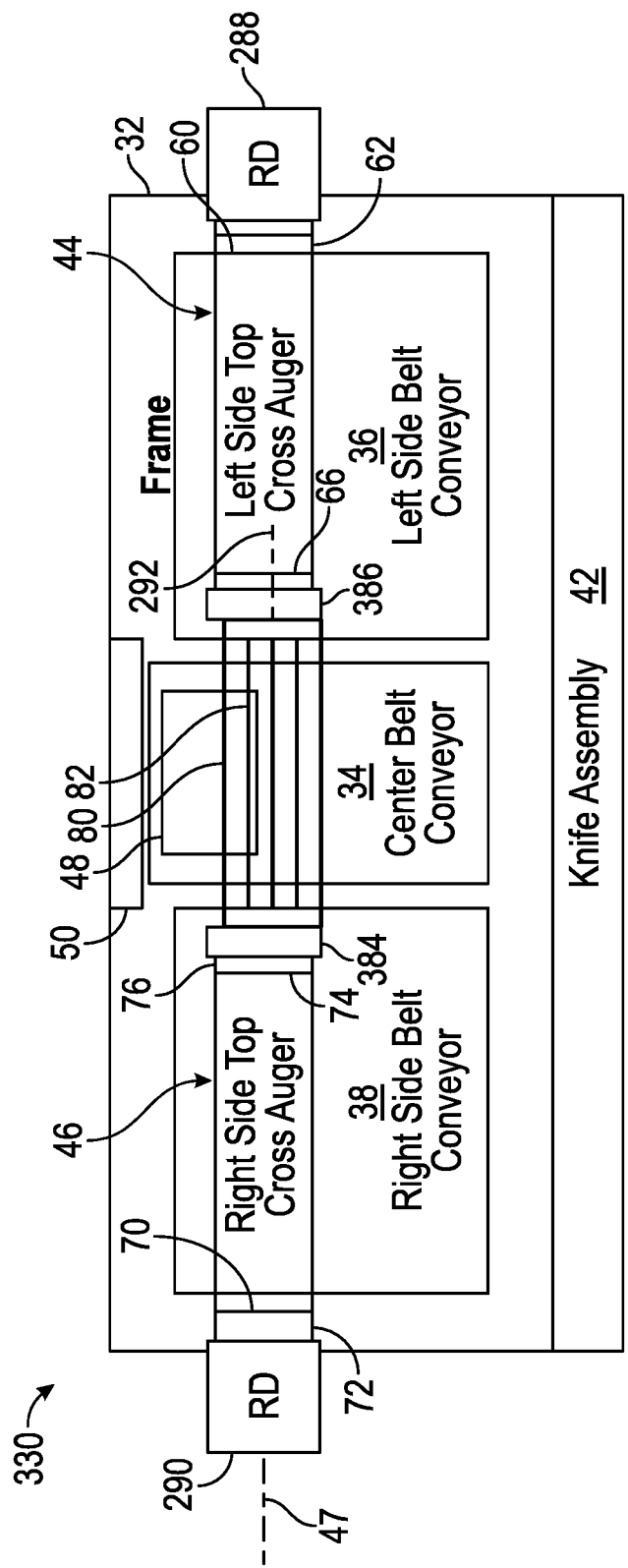
FIG. 5 is a schematic diagram of portions of an example draper platform for a combine.

FIG. 5 schematically illustrates portions of another example draper platform 330 for use in a combine harvester. Draper platform 330 is similar to be draper platform 230 except that that draper platform 330 is illustrated as comprising torque coupler 384 and bearing coupler 386 in place of torque coupler 284 and bearing coupler 286. Those remaining components or structures of draper platform 330 which correspond to structures or components of draper platform 230 are numbered similarly.

Torque coupler 384 and bearing coupler 386 rotationally support central roller baffle 84 rotation about a rotational axis 292 that is offset from axis 47 about which augers 44, 46 are rotatably driven. Similar to torque coupler 284, torque coupler 384 comprises an interface between the inner end 74 of auger 46 and the outer end of central roller baffle 80. Torque coupler 384 transmits torque or rotational movement from auger 46, about axis 47, to central roller baffle 80 for rotation about axis 292. In one implementation, torque coupler 384 comprises a gear train for transmitting torque from one axis to another axis. In another implementation, torque of 34 may comprise a chain and sprocket arrangement or a belt and pulley arrangement for transmitting torque from one axis to another axis.

Bearing coupler 386 comprises an interface between the inner end 64 of auger 44 and the outer end of central roller baffle 80. Bearing coupler 386 supports baffle 80 for rotation about axis 292 and relative to the rotation of auger 44 about axis 47. In one implementation, bearing coupler 286 may comprise a rotational bearing between auger 44 and baffle 80 or between roller baffle 80 and journal support 66.

Figure 6:
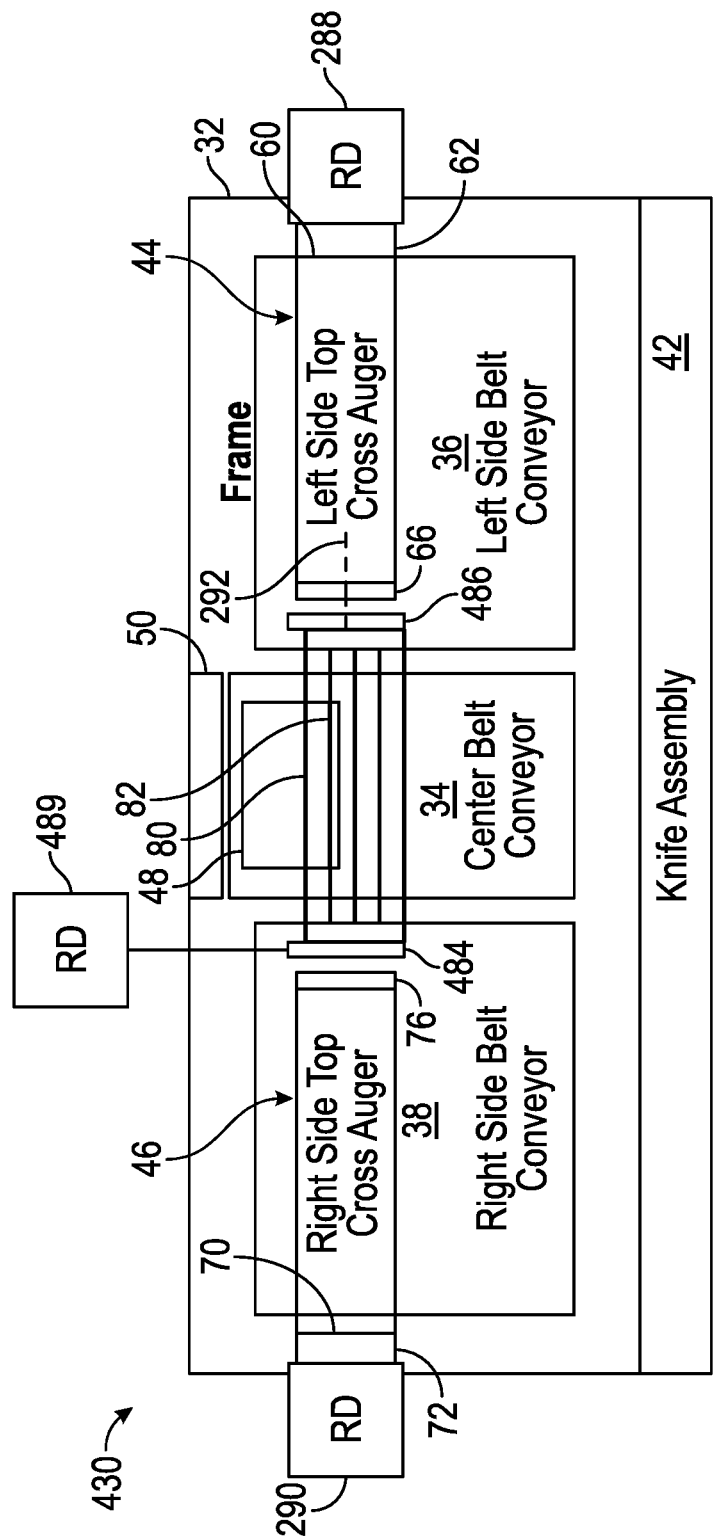
FIG. 6 is a schematic diagram of portions of an example draper platform for a combine.

FIG. 6 schematically illustrates portions of another example draper platform 430 for use in a combine harvester. Draper platform 430 is similar to be draper platform 30 except that that draper platform 430 is illustrated as comprising central roller baffle journal supports 484, 486 and rotary drive 489. Those remaining components or structures of draper platform 430 which correspond to structures or components of draper platform 30 are numbered similarly.

Journal supports 484 and 486 comprise structures supported by frame 32 that rotationally support central roller baffle 80 for rotation about axis 292. Journal supports 484 and 46 are spaced from the inner ends of augers 44, 46 as well as their respective journal supports 286 and 284. In one implementation, journal supports 44 can may comprise structures that include roller bearings, bushings and/or other structures that facilitate rotation of baffle 80. In some implementations, journal supports 484 and 486 may alternatively rotationally support central roller baffle 80 about the same axis 47 about which augers 484 and 486 rotate, but where top cross augers 44 and 46 are spaced from the inner ends of augers 44, 46 as well as their respective journal supports 286 and 284.

Rotary drive 489 comprises a mechanism operably coupled to central roller baffle 80, such as through or across one of journal supports 484, 486, so as to supply torque and rotationally drive central roller baffle 80. In one implementation, rotary drive 489 is synchronized with rotary drive 288 and 290. In another implementation, rotary drive 489 rotates baffle 80 at a speed distinct from that of augers 44, 46. In one implementation, rotary drive 489 utilizes a separate source of power than that of rotary drive 288, 290, such as a separate hydraulic motor, electric motor or the like. In other implementations, rotary drive 489 utilizes same source of torque as rotary drive 288, 290, but transmits such torque through a separate transmission to baffle 80.

Figure 7:
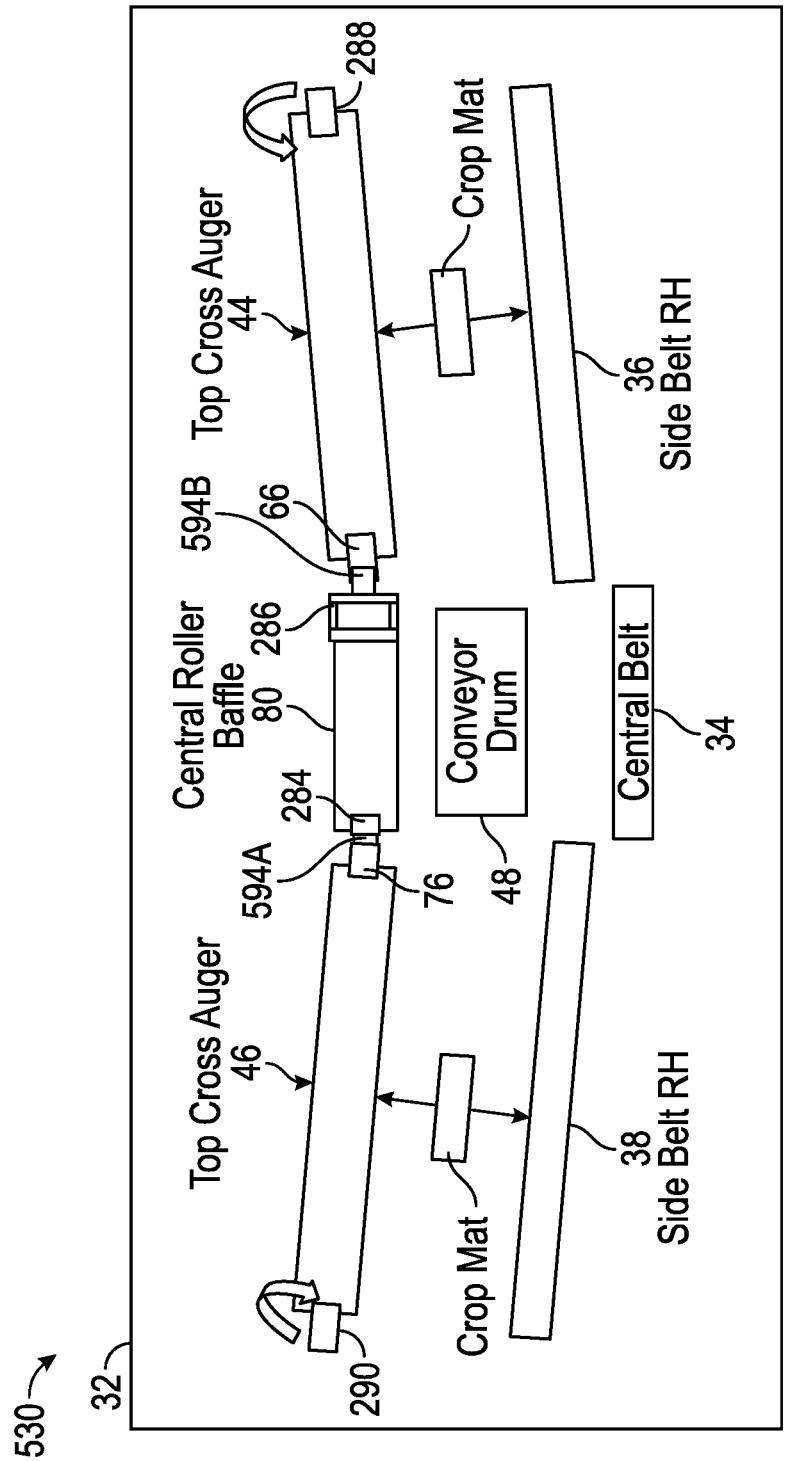
FIG. 7 is a schematic diagram of portions of an example draper platform for a combine, illustrating top cross augers in first orientations.
Figure 8:
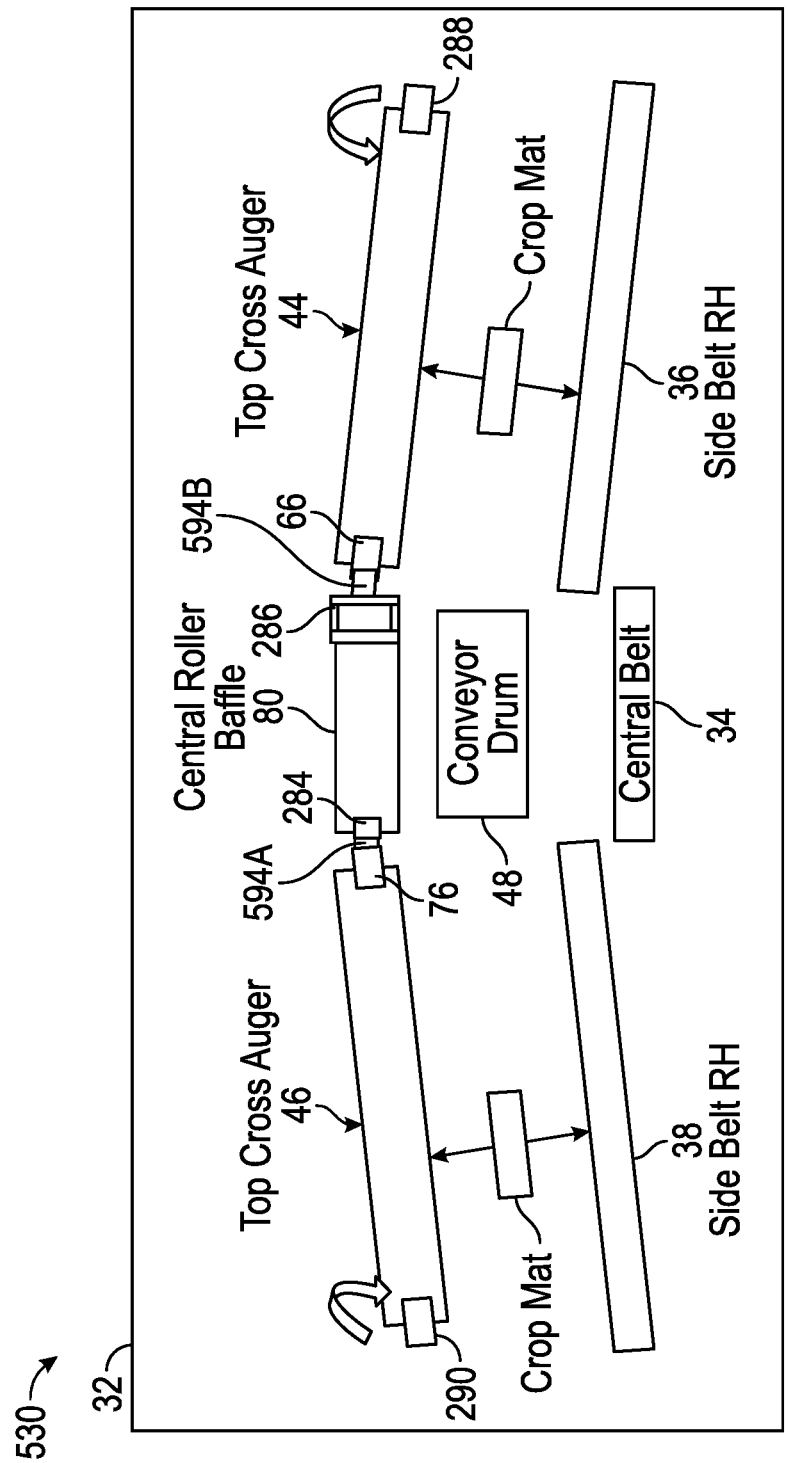
FIG. 8 is a schematic diagram of the example draper platform of FIG. 7, illustrating the top cross augers in second orientations.

FIGS. 7 and 8 are front views schematically illustrating portions of another example draper platform 530. For ease of illustration, FIGS. 7 and 8 omit knife assembly 42 which extends along the front edge of belt conveyors 34, 36 and 38. In one implementation, knife assembly 42 flexes with the repositioning of belt conveyors 36 and 38.

Draper platform 530 is similar to draper platform 230 described above except that central roller baffle 80 is coupled to and between augers 44 and 46 by universal joints 594A, 594B (collectively referred to as universal joints 594). Universal joint 594A connects central roller baffle 80 to right side top cross auger 46, either directly or indirectly via journal support 76. Universal joint 594B connects central roller baffle 82 left side top cross auger 44, either directly or indirectly via journal support 66. In the example illustrated, journal supports 288 and 290 also comprise universal joints.

As shown by FIGS. 7 and 8, universal joints 594 and journal supports 288, 290 facilitate pivoting of augers 44 and 46 relative to central roller baffle 80. FIGS. 7 and 8 illustrate augers 44 and 46 pivoted to the extreme race positions and their extreme lowered positions. Although FIGS. 7 and 8 illustrate both of augers 44, 46 either pivoted to a fully raised position or pivoted to a fully lowered position, it should be appreciated that the direction and/or extent to which augers 44 and 46 pivot with respect to one another may vary. For example, auger 44 may be pivoted in an upward direction by a first extent while auger 46 is pivoted downwards by a second different extent.

Universal joints 594 may further assist in maintaining augers 44 and 46 at angles that are aligned with a depth of the crop mat residing on belts 36 and 38. For example, as the height or thickness of the crop mat residing on belt 36 increases, top cross auger 44 may pivot in an upward direction. As a height or thickness of the crop mat residing on belt 36 decreases, top cross auger 44 may pivot in a downward direction.

Figure 9:
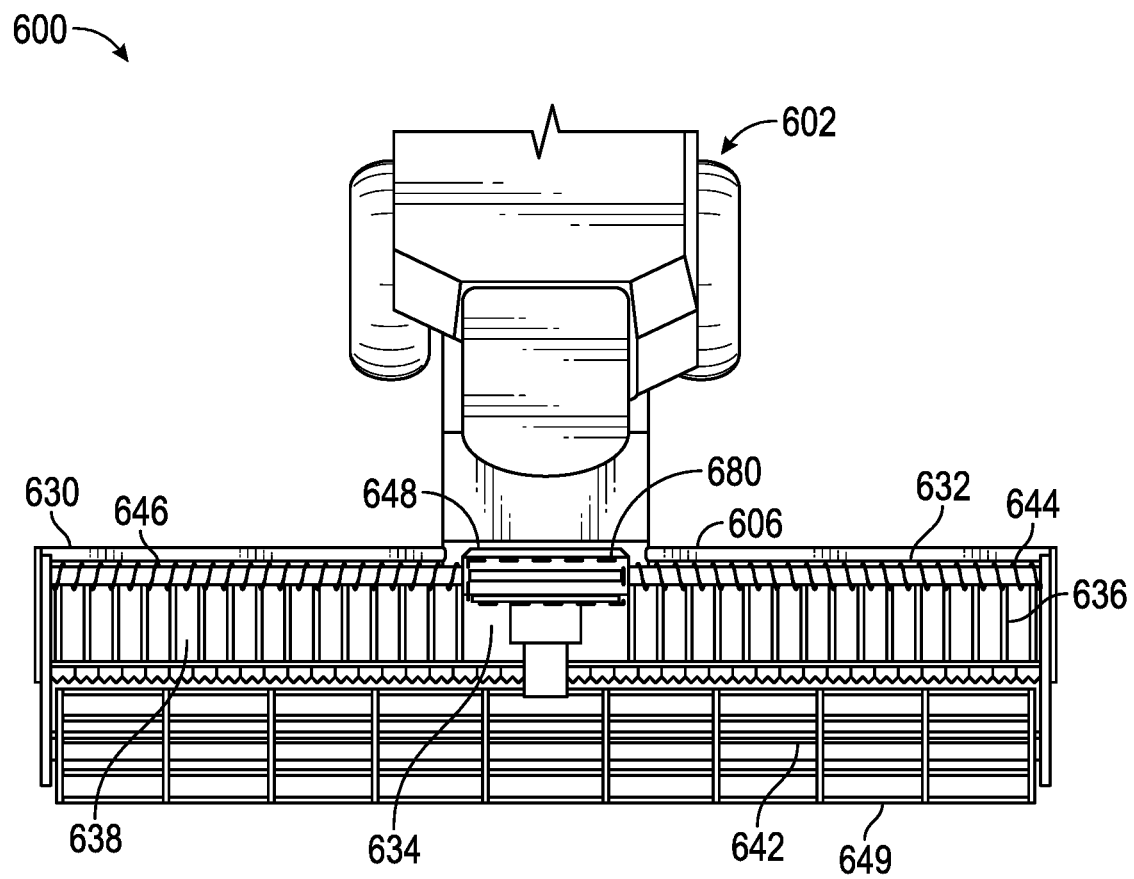
FIG. 9 is a fragmentary top view of an example harvester or combine having an example draper platform.
Figure 10:
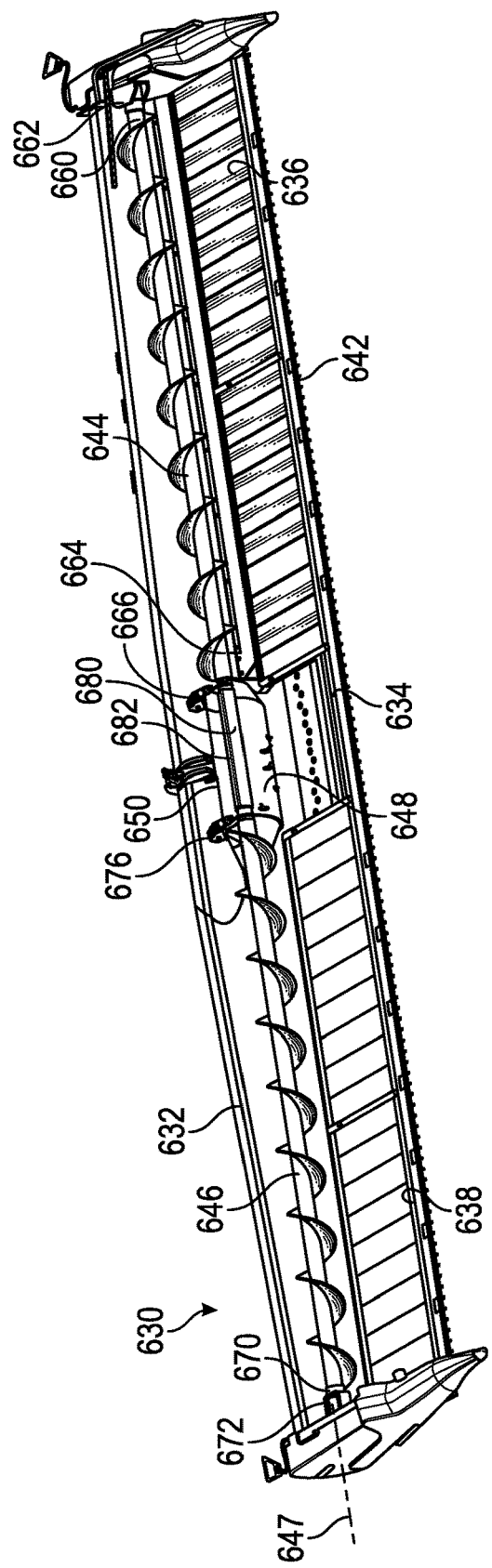
FIG. 10 is a front perspective view of the draper platform of FIG. 9 provided with an example central roller baffle.
Figure 11:
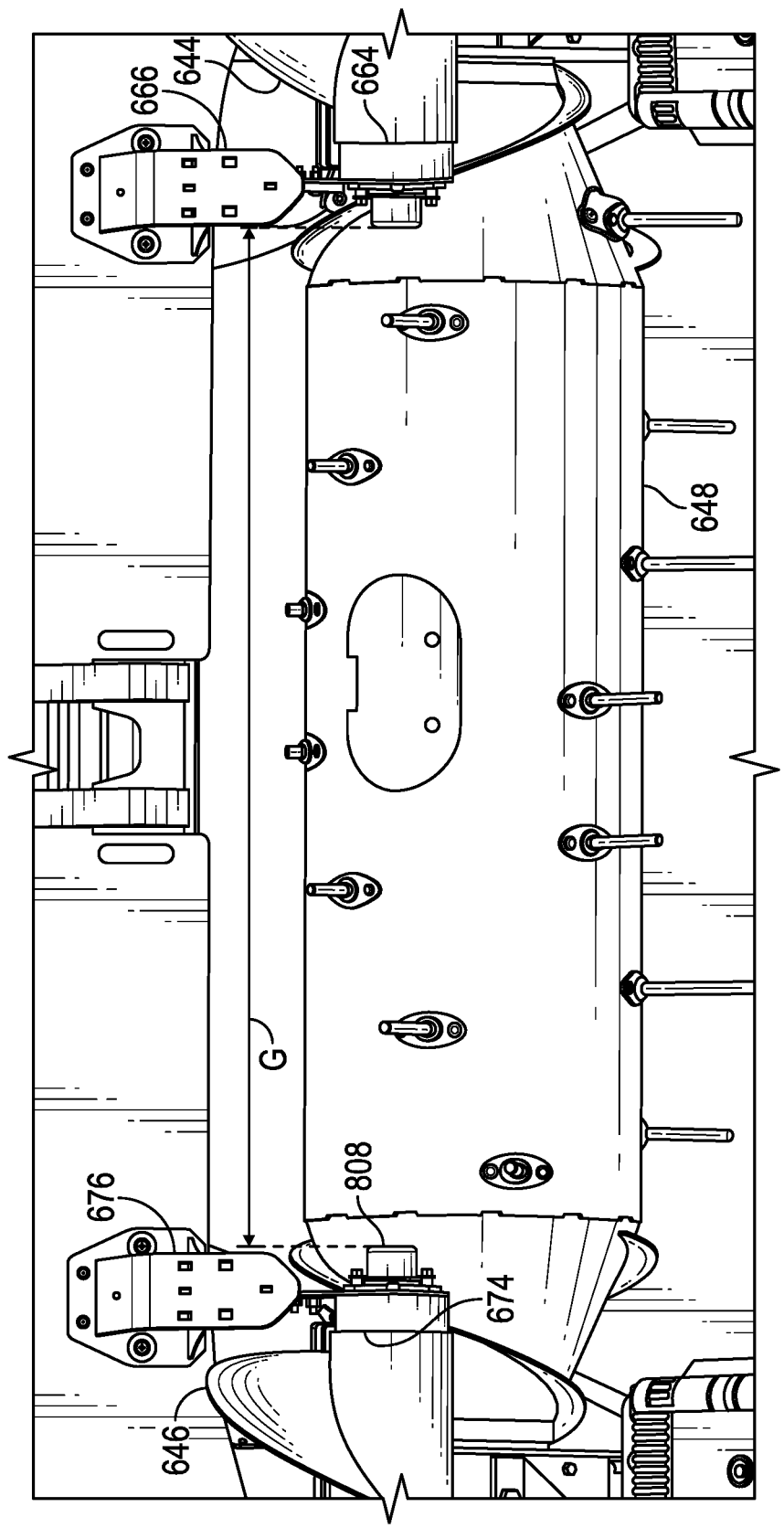
FIG. 11 is a fragmentary top view of a portion of the draper platform of FIG. 10 with the central roller baffle having been removed.

FIGS. 9-11 illustrate portions of an example combine 600 comprising an example draper platform 630 having a removable central roller baffle. FIG. 10 illustrates draper platform 630 without the gathering reels 649 shown in FIG. 9. FIG. 11 is a top view of portions of draper platform 630 with the central roller baffle 680 removed.

As shown by FIG. 9, combine 600 comprises a main drive unit 602 that supports draper platform 630 and moves or carries draper platform 630 across a field during harvesting. Main drive unit 602 comprises a feeder or feeder housing 606 which conveys crops gathered by head 630 to internal mechanisms within main unit 602 which further separate and clean selected portions of the crop, such as grain, from the accompanying biomass material, such as husk, chaff and the like. In one such implementation, main drive unit 602 includes straw walkers or a rotary threshing mechanism with rearwardly located chafers or sieves for separating out grain. In one implementation, the cleaned crop or grain is conveyed to a holding tank for subsequent discharge. In some implementations, the non-grain portions or biomass are discharged at a rear of the combine 600.

As shown by FIGS. 9 and 10, the example draper platform 630 generally comprises frame 632, center belt conveyor 634, left side belt conveyor 636, right side belt conveyor 638, reciprocating knife assembly 642, gathering reels 643, left side top cross auger 644, right side top cross auger 646, conveyor drum 648 and central roller baffle 680 (shown in FIGS. 9 and 10).

Frame 632 comprises an arrangement of panels, beams, brackets and the like supporting the remaining components of platform 632. Frame 632 is configured to be mounted or coupled to a feeder house of a combine in a permanent or removable fashion. Frame 632 includes a rear center opening 650 through which crop may be fed to the feeder house 606.

Center belt conveyor 634 comprises an endless conveyor belt situated directly in front of center opening 650 between left side conveyor belt 636 and right side conveyor belt 538, behind knife assembly 642. Center conveyor belt 634 is operably coupled to a source of torque, a rotary drive, that drives center belt conveyor 634 rollers or other support structures so as to carry or convey crop material cut by knife assembly 642 in a rearward direction through opening 650 to the feeder house 606 (shown in FIG. 9)) of the combine 600.

Left side conveyor belt 636 extends on the left side of center belt conveyor 634 (as seen from behind draper platform 630). Left side conveyor belt 636 comprises an endless web or conveyor belt operably coupled to a source of torque or rotary drive so as to carry the crop material cut by knife assembly 642 toward center belt conveyor 634. Right side conveyor belt 638 extends on the right side of center belt conveyor 634 (as seen from behind draper platform 630). Right side conveyor belt 638 comprises an endless web or conveyor belt operably coupled to a source of torque or rotary drive so as to carry the crop material cut by knife assembly 642 toward center belt conveyor 634.

Knife assembly 642 comprises at least one elongate reciprocating knife assembly extending along a front edge of platform 630. Knife assembly 642 cuts or severs the crop from its growing medium. In one of limitation, knife assembly 642 comprises a single knife assembly extending across the entire front of platform 630. In other implementations, knife assembly 642 may comprise multiple subsections or sub knife assemblies that collectively extend across the front of platform 630. One example of a knife assembly 642 may comprise a cutter bar and knife guards that guide a reciprocating knife or knife sections.

Gathering reels 643 are rotatably supported by frame 632 over knife assembly 642. Gathering reels 643 gather and direct the crop towards knife assembly 642 and onto conveyors 634, 636 and 638.

Left side top cross auger 644 comprises an auger rotatably supported proximate a rear of frame 632 above left side conveyor 636. Left side top cross auger 644 is located on a left side (as seen from behind platform 630) of center belt conveyor 634. Left side top cross auger 644 has opposite end portions that are journaled. Left side top cross auger 644 has an outer end 660 supported by a journal support 662 and an inner journaled end 664 rotatably supported by journal support 666. Journal supports 662 and 666 rotationally support ends 660 and 664 of left side top cross auger, respectively. Journal supports 662 and 666 may comprise bearings that rotationally support a shaft of left side top cross auger relative to frame 632 above left side conveyor 636.

Right side top cross auger 646 comprises an auger rotatably supported proximate a rear of frame 632 above right side conveyor 638. Left side top cross auger 644 and right side top cross auger 646 are coaxial, configured to be rotatably driven about a single horizontal axis 647. Right side top cross auger 646 is located on a right side (as seen from behind platform 630) of center belt conveyor 634. Right side top cross auger 646 has opposite end portions that are journaled. Right side top cross auger 646 has an outer end 670 supported by a journal support 672 and an inner journaled end 674 rotatably supported by journal support 676. Journal supports 672 and 676 rotationally support ends 670 and 674 of right side top cross auger, respectively. Journal supports 672 and 676 may comprise bearings that rotationally support a shaft of right side top cross auger relative to frame 632 above left side conveyor 636.

Figure 20:
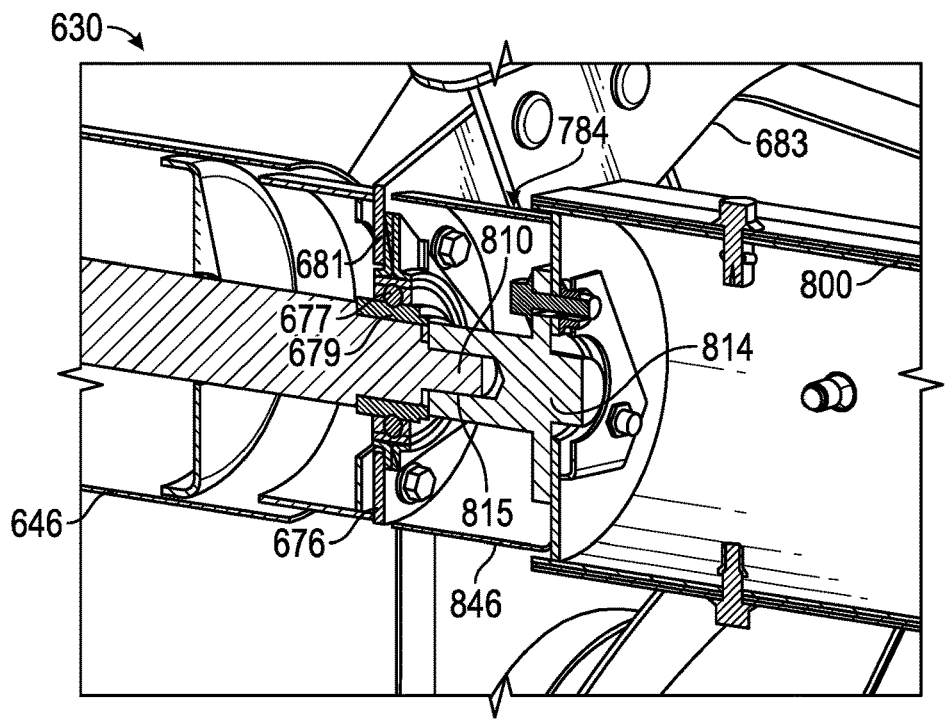
FIG. 20 is a sectional view of the torque coupler coupling the left side top cross auger and the central roller baffle support.
Figure 21:
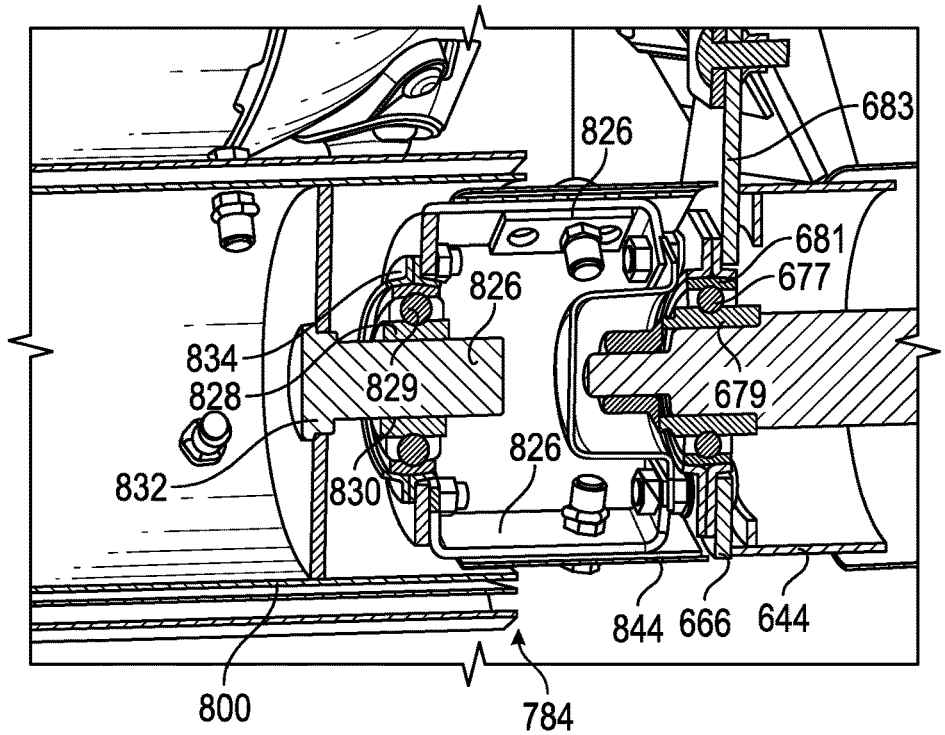
FIG. 21 is a sectional view of the bearing coupler coupling the right side top cross auger in the central roller baffle support.

Examples of journal supports 662, 666, 672, 676 are shown in FIGS. 20 and 21. In the example illustrated, journal support 676 (shown in FIG. 20) and journal support 666 (shown in FIG. 21), which are similar to journal supports 662 and 672, comprise roller bearings 677 captured between bearing races, first bearing race 679 secured to a shaft of the respective auger 644, 646 and a second race 681 secured to a support 683 extending from frame 632. In other implementations, such journal supports 662, 666, 672, 676 may have other configurations.

Conveyor drum 648 comprises a drum rotatably supported above center belt conveyor 634. Conveyor drum 648 is operably coupled to a source of torque, a rotary drive (not shown) so as to be rotatably driven about a horizontal axis, parallel to the axis 647 about which augers 644 and 646 are rotatably driven. Conveyor drum 648 may include crop engaging elements, such as tines, baffles or the like that cooperate with center belt conveyor 634 to move and direct cut crop through opening 650 to the feeder house of the combine. In the example illustrated, conveyor drum 648 is rotatably driven about an axis rearwardly offset from axis 647.

As shown by FIG. 11, journal supports 666 and 676 support ends 664 and 674, respectively, at spaced locations, forming a space or gap G therebetween. The gap G extends directly above conveyor drum 648 and directly above center belt conveyor 634. In the example illustrated, the gap G has a length (in a direction parallel to axis 647) sufficient to receive an elongate central roller baffle. In one implementation, the length of gap G is at least 2 feet. Journal supports 666 and 676 independently support the ends of augers 644 and 646 to facilitate the use of platform 630 with the formed gap G and without any intermediate central roller baffles to accommodate certain crop conditions. Although journal supports 666 and 676 are illustrated at the extreme inner ends of augers 644 and 646, respectively, in other implementations, journal supports 666 and 676 may be located at and support intermediate portions of augers 644 and 646, wherein the extreme inner ends are cantilevered, but are still spaced from one another by gap G.

Central roller baffle 680 is similar to central roller baffle 80 described above. Central roller baffle 680 includes at least one exterior crop driver 682. Crop driver 682 comprises at least one surface radially or otherwise outwardly projecting in a direction away from the rotational axis of baffle 680 so as to engage and drive crop material towards opening 650 when being rotatably driven. In one implementation, crop driver 682 may comprise a series of fingers or tines. In another implementation, crop driver 682 may comprise a series of elongated baffle plates facing in directions tangent to the rotational axis of central roller baffle 680 extending parallel to or along the rotational axis of central roller baffle 680. In one implementation, central roller baffle 680 may comprise a cylindrical structure or tube from which such baffle plates project or extend. In another implementation, central roller baffle 680 may comprise a structure wherein multiple baffle plates intersect one another along an intersection line coincident with the rotational axis of central roller baffle 680. In yet another implementation, central roller baffle 680 may comprise a noncircular cross-sectional shape such as a polygonal shape or an oval cross-sectional shape. In yet another implementation, central roller baffle 680 may have an asymmetrical cross-sectional shape, wherein the exterior of central roller baffle 680 comprises bulges and/or depressions that, similar to paddles, drive and engage crop. In yet other implementations, central roller baffle 680 may have other configurations.

In some implementations, crop driver 682 may be integrally formed as a single unitary body. For example, crop driver 682 may comprise a square or rectangular tube, and elliptical tube or the like. Crop primary two may comprise fixed tines, plates, baffles or other projections for driving crop.

In some implementations, crop driver 682 may be releasably or removably supported by a central support of central roller baffle 680. For example, in one implementation, crop driver 682 may comprise at least one plate which is removably mountable to the exterior of the central support portion of roller baffle 680. In such an implementation, differently configured plates may be interchangeably mounted to the central support portion to provide central roller baffle 680 with different levels of aggressiveness with respect to driving a crop. In one implementation, multiple sets of different plates offering different customized levels of crop driving aggressiveness may be interchangeably mounted to the central support of baffle 680 with the same mounting structures. In some implementations, the at least one plate which is removably mounted to the central support of central roller baffle 680 may be configured such that the orientation in which such plates are mounted to the central support portion impacts the level of aggressiveness central roller baffle 680 has with respect to driving a crop. For example, the same plate may offer a first level of crop driving aggressiveness when in a first orientation and may offer a second greater level of crop aggressiveness when mounted to the central support portion of baffle 680 in a second orientation, such as 180° from the first orientation.

As with draper platforms 30, 230, 330, 430 and 530, draper platform 630 offers a user the ability to change the configuration of draper platform 630 in multiple fashions. Depending upon crop conditions, a user may remove the entire central roller baffle 680. Depending upon crop conditions, user may insert first central roller baffle 680 having a first crop driver 82 offering a first degree of crop driving aggressiveness. If crop conditions change once again, the user may remove the first central roller baffle 680 and insert a second central roller baffle having a second crop driver 682 offering a second degree of crop driving aggressiveness. In some circumstances, the user may leave the central roller baffle 680 in place, but instead remove the current crop driver 682 and mount a different crop driver 682 having a different degree of crop driving aggressiveness.

FIG. 12 is a sectional view illustrating an example central roller baffle 780 removably mounted between augers 646 and 644 of draper platform 630 by example couplers 784 and 786. In the example illustrated, central roller baffle 780 comprises a reconfigurable roller baffle comprising a rotatable support 800 and a removable or exchangeable crop driver 802 (schematically shown). In other implementations, central roller baffle 780 may comprise a roller baffle having crop drivers that are permanently affixed to or integrally formed as a single unitary body with a rotatable support 800.

Rotatable support 800 serves as a central support structure or portion for roller baffle 780. In the example illustrated, rotatable support 800 comprises an elongate cylinder extending along axis 647 having opposite axial ends coupled to augers 646 and 644 by couplers 784 and 786, respectively. Rotatable support 800 has an outer surface comprising a plurality of mounting structures 806 by which crop drivers 802 may be removably mounted. In the example illustrated, rotatable support 800 comprise threaded bores for receiving fasteners that also extend through portions of crop driver 802. In other implementations, rotatable support 800 may have other non-circular cross-sectional shapes and may utilize an alternative mounting structures or mounting structures having a different arrangement along support 800.

FIGS. 13-16 illustrate the removable mounting of support 800 to augers 646. FIGS. 13-16 illustrate the mounting of torque coupler 784 between augers 646 and support 800. Torque coupler 784 is an example of torque coupler 284 described above. Torque coupler 784 facilitates the transmission of torque rotational movement from augers 646 two support 800 and roller baffle 780.

Figure 14:
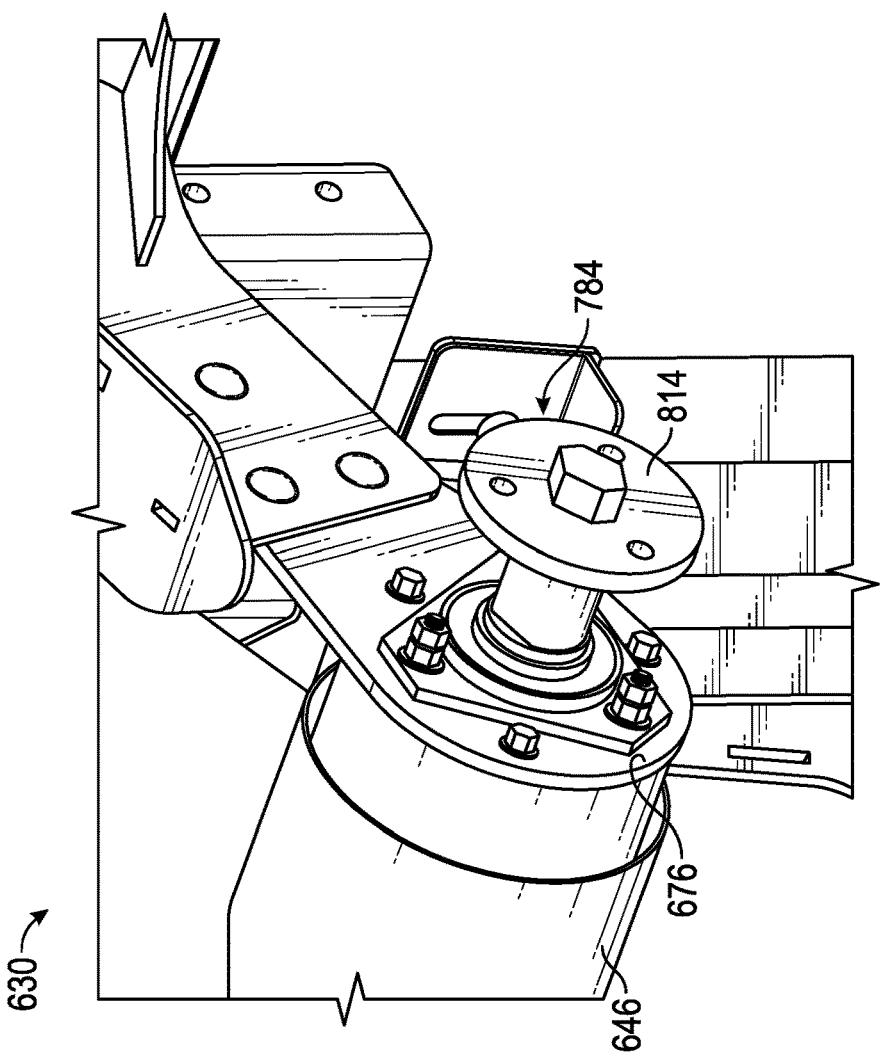
FIG. 14 is a perspective view of portions of a torque coupler being mounted to the left side top cross auger.
Figure 13:
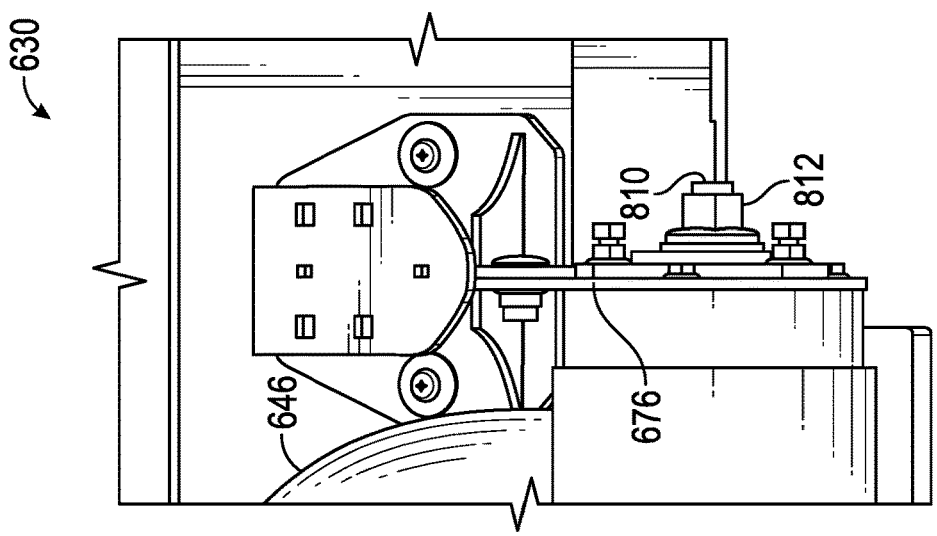
FIG. 13 is a top view of an inner end of a left side top cross auger.

FIG. 13 illustrates the inner end of augers 646 following removal of a protective cap 808 (shown in FIG. 11) to expose an externally threaded shaft 810 over which a nut 812 is positioned. FIG. 14 illustrates the removal of nut 812 and the mounting of flanged shaft 814. In the example illustrated, flanged shaft 814 comprise an internally threaded bore 815 (shown in FIG. 21) which threadably engages external cutter at the threads of shaft 810. The threads are configured such that the crop driving rotation of auger 646 relative to shaft 814 tightens the threaded coupling (further screws or threads shaft 810 into threaded bore 815 until no further rotation is permitted). As a result, reliable securement of shaft 814 to auger 646 is maintained. In other implementations, shaft 814 may be secured to the axial end of auger 646 in other manners.

Figure 15:
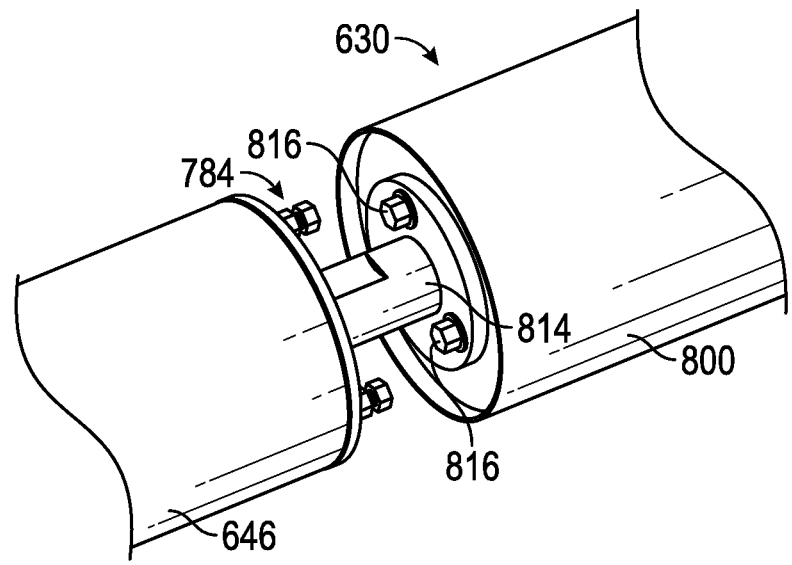
FIG. 15 is a perspective view of the torque coupler of FIG. 14 being further mounted to an example central roller baffle support of an example central roller baffle.
Figure 16:
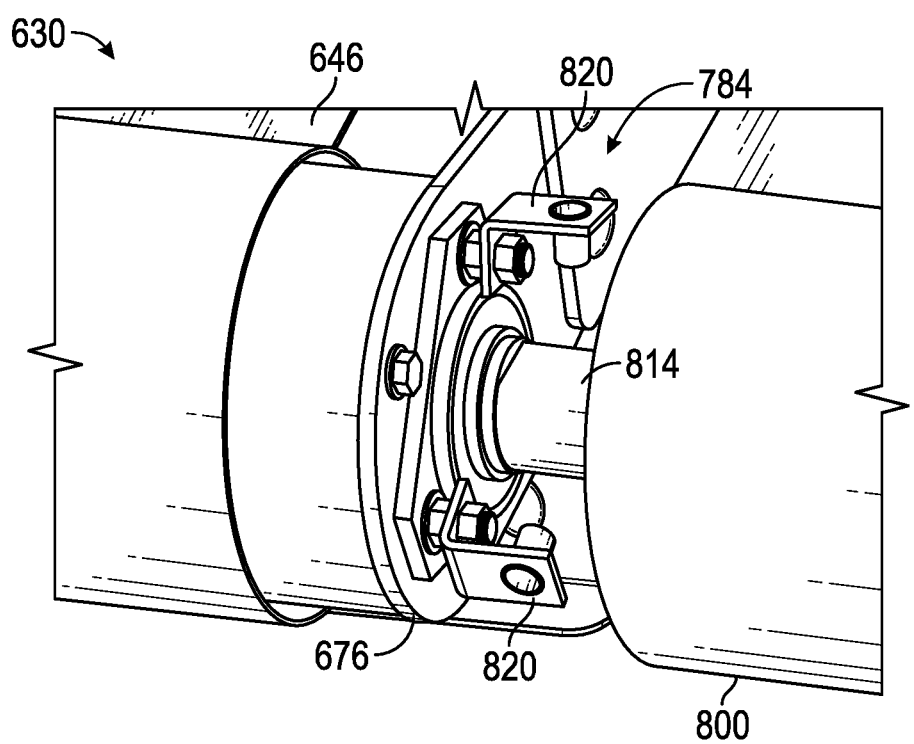
FIG. 16 is a perspective view illustrating wrap guard brackets mounted to the left side top cross auger.

As shown by FIG. 15, flanged shaft 814 is further fastened to the the outer axial end of support 800 by fasteners 806. In other implementations, flanged shaft 814 may be secured to support 800 in other fashions. As shown by FIG. 16, brackets 820 are further fastened to the axial end of auger 646. As will be described hereafter, brackets 820 facilitate the mounting of wrap guards.

Figure 17:
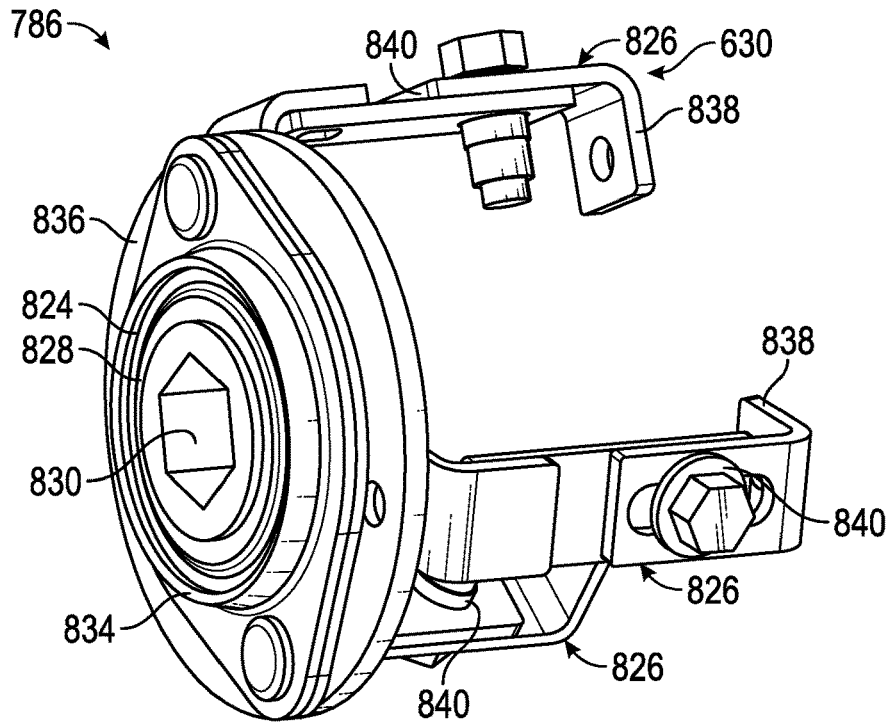
FIG. 17 is a perspective view of an example bearing coupler.
Figure 18:
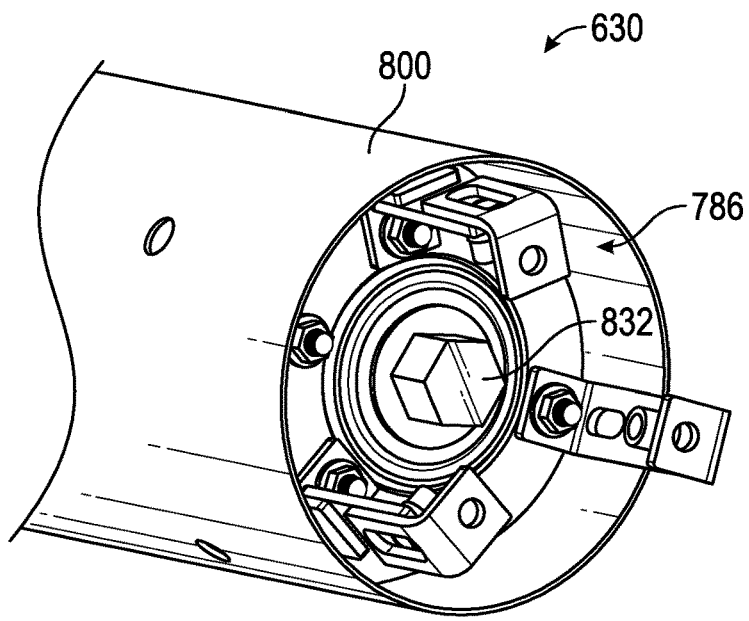
FIG. 18 is perspective view of the example bearing coupler of FIG. 17 mounted to an outer end of the central roller baffle support of FIG. 15.

FIGS. 17 and 18 illustrate one example of the mounting of bearing coupler 786 to the outer end of support 800. Bearing coupler 786 is one example of bearing coupler 286 described above. Bearing coupler 286 facilitates relative rotation of auger 644 with respect to central roller baffle support 80.

FIG. 17 illustrates an example bearing coupler 786 prior to being mounted to support 800. As shown by FIG. 17, bearing coupler 786 comprises bearing 824 and brackets 826. Bearing 824 comprises a center portion 828 having a non-circular central bore 830 which is to be keyed onto a corresponding non-circular shaft 832 of support 800. Center portion 828 is supported by internal bearings, such as roller bearings or ball bearings 829 (shown in FIG. 22), relative to an outer ring 834.

Brackets 826 are coupled to outer ring 834 by an intermediate plate 836. Brackets 826 have mounting portions 838 for fastening to an axial end of auger 644. In the example illustrated, brackets 826 further comprise mounting portions 840 for securing a wrap guard.

Figure 19:
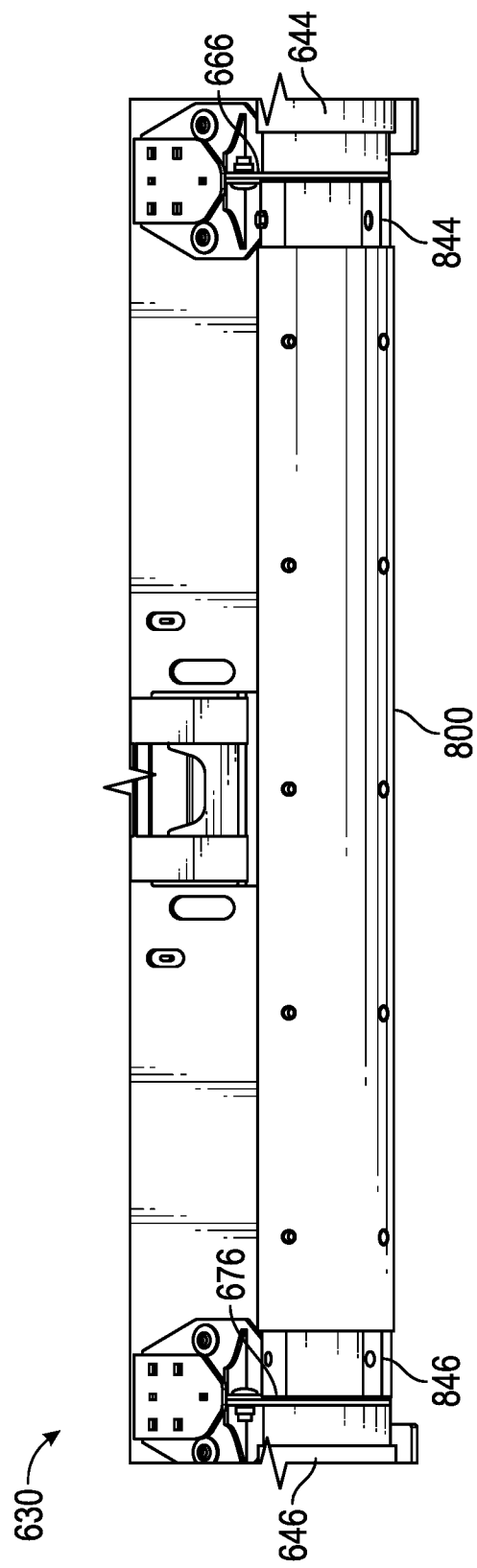
FIG. 19 is a perspective view of the example central roller baffle support movably mounted between left and right top cross augers.

FIGS. 19-21 illustrate the completed assembly of support 802 couplers 784, 786 between augers 644 and 646. As shown by FIGS. 19-21, wrap guards 844 and 846 are mounted to brackets 826 and 820 (shown in FIG. 15). Wrap guard 844 covers and overlaps brackets 826 and is partially nested within the axial end of support 800. Likewise, wrap guard 866 covers and overlaps brackets 820 and is partially nested within the axial end of support 800.

Figure 22:
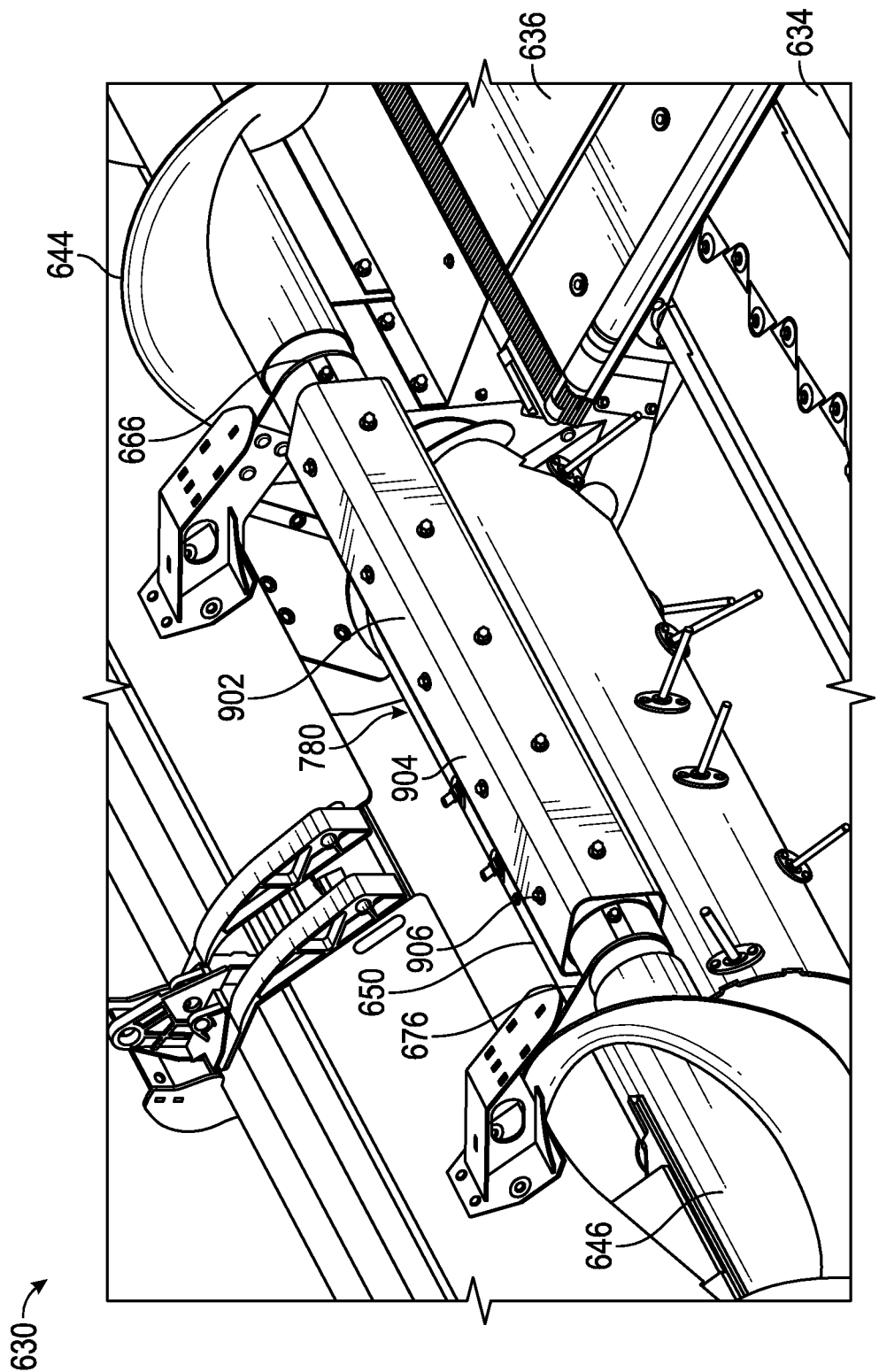
FIG. 22 is a perspective view of the example draper platform of FIG. 10 with an example crop driver movably mounted to the central roller baffle support.
Figure 23:
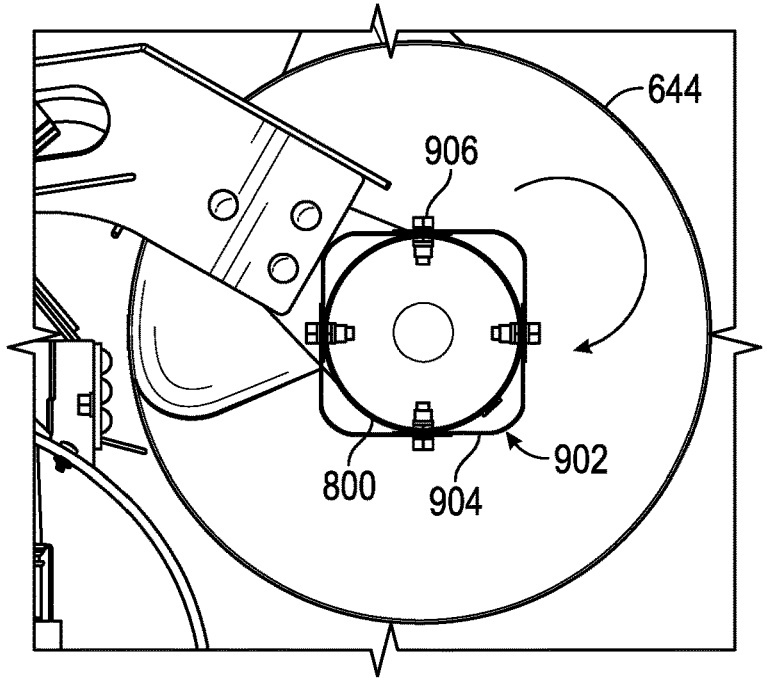
FIG. 23 is a sectional view of portions of the draper platform of FIG. 22.

FIGS. 22 and 23 illustrate an example crop driver 902 removably mounted on support 800 of central roller baffle 780 of draper platform 630. As shown by FIG. 23, crop driver 902 are in the form of four angled plates 904 which, when mounted about the port 800 by fasteners 906, provide central roller baffle 780 with a polygonal outer profile or cross-sectional shape. In the example illustrated, plates 904 provide baffle 780 with a square outer profile or cross-sectional shape. In other implementations, central roller baffle 780 may be provided with other outer profiles or cross-sectional shapes with other combinations of plates.

In other implementations, the outer profile of baffle 780 may be provided with a fewer or lesser number of such plates, with plates having other shapes or with other non-plate structures. In other implementations, crop driver 902 may be secured to support 800 in other fashions. For example, in other implementations, crop driver 902 may be secured using a tongue and groove arrangement, wherein one of support 800 and the structures that form crop driver 902 has a tongue and the other of support 800 and the structures that form crop driver 902 has a corresponding groove that slidably receives the tongue.

Figure 24:
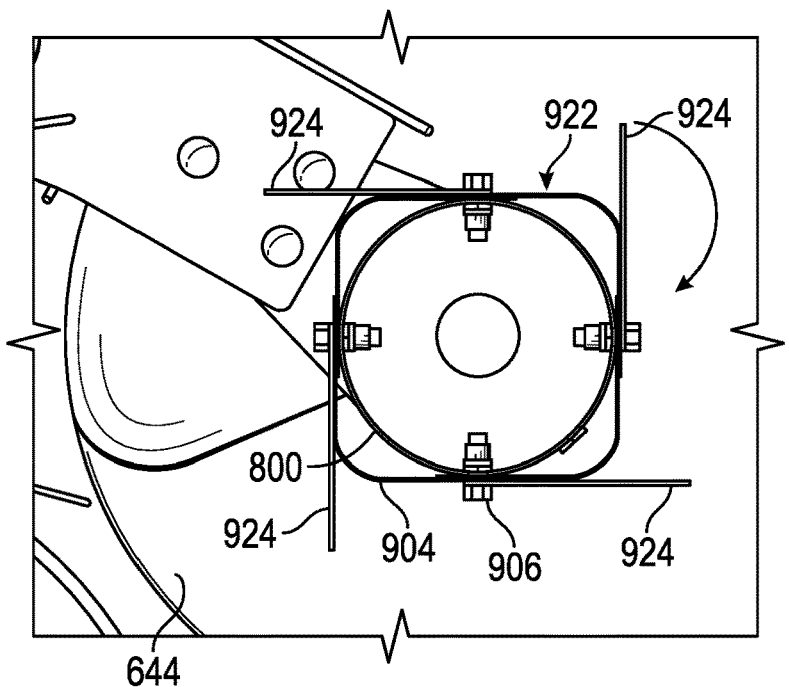
FIG. 24 is a sectional view of portions of the draper platform of FIG. 10 with another example central roller baffle.
Figure 25:
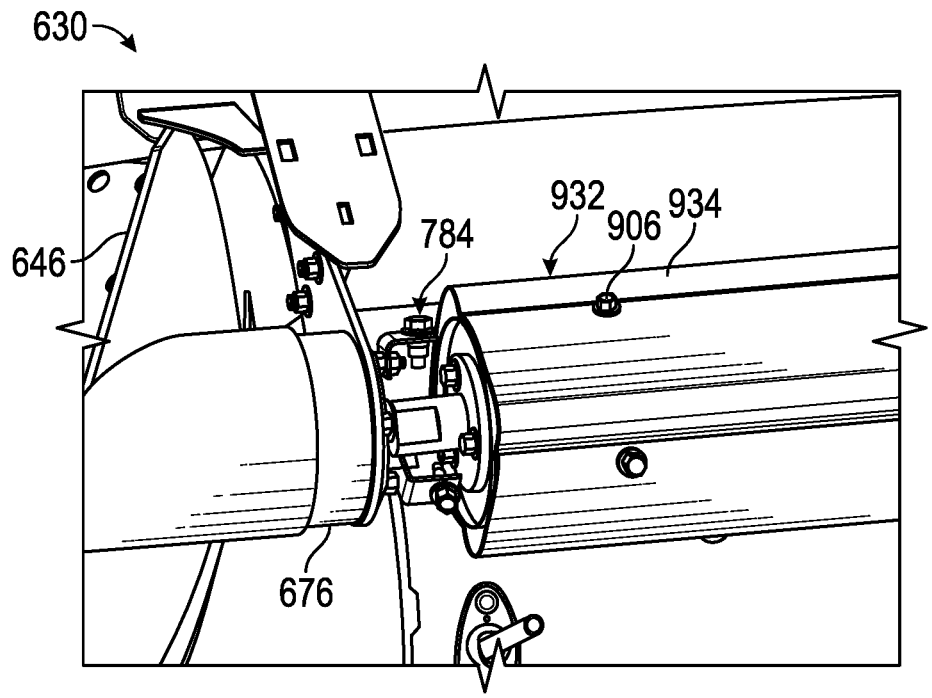
FIG. 25 is a perspective view of portions of the draper platform of FIG. 10 with another example central roller baffle, illustrating the example torque coupler connecting the left top cross auger and the central roller baffle.

FIG. 24 is a sectional view illustrating crop driver 922 removably mounted to support 800. Crop driver 922 is similar to crop driver 902 except that crop driver 922 additionally comprises baffles 924. Baffles 924 comprise elongate plates having openings that align with openings of plates 904 such that baffles 924 may be secured to plates 904 and support 800 with the same fasteners 906. In one implementation, baffles 924 extend along an entire axial length of support 800. In other implementations, baffles 924 may comprise multiple individual baffles spaced along the axial length of support 900.

Baffles 924 project outwardly beyond the corners of the outer profile formed by plates 904 to provide for more aggressive driving of the crop. In crop conditions warranting a more aggressive driving of crops, a user may remove faster 906 and additionally mount baffles 924 in place. In crop conditions warranting a less aggressive driving of crops, a user may remove baffles 924 as needed.

Figure 26:
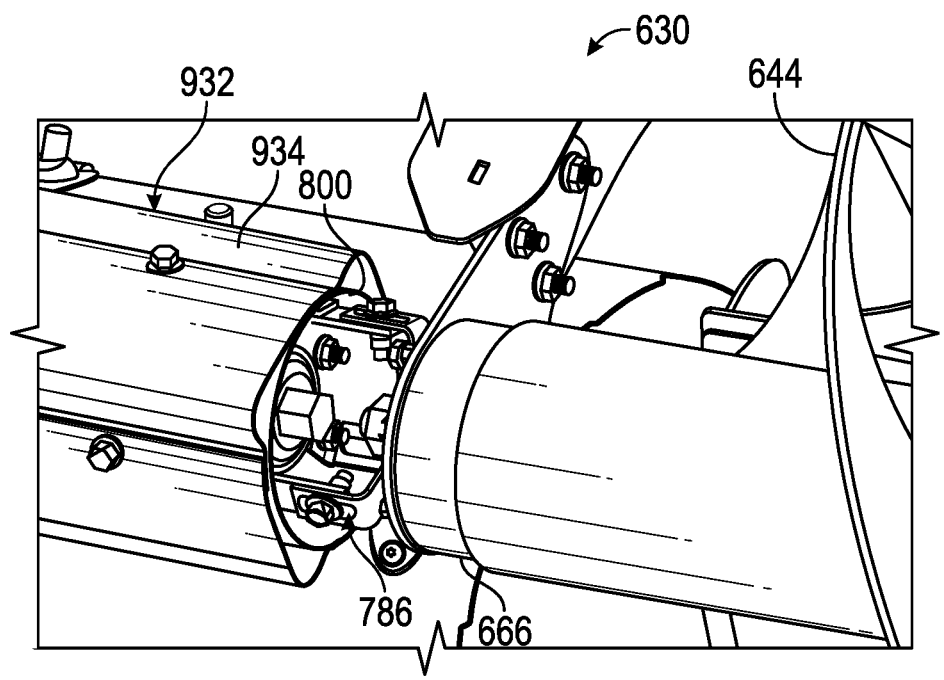
FIG. 26 is a perspective view of portions of the draper platform of FIG. 25, illustrating the example bearing coupler connecting the right top cross auger and the central roller baffle.
Figure 27:
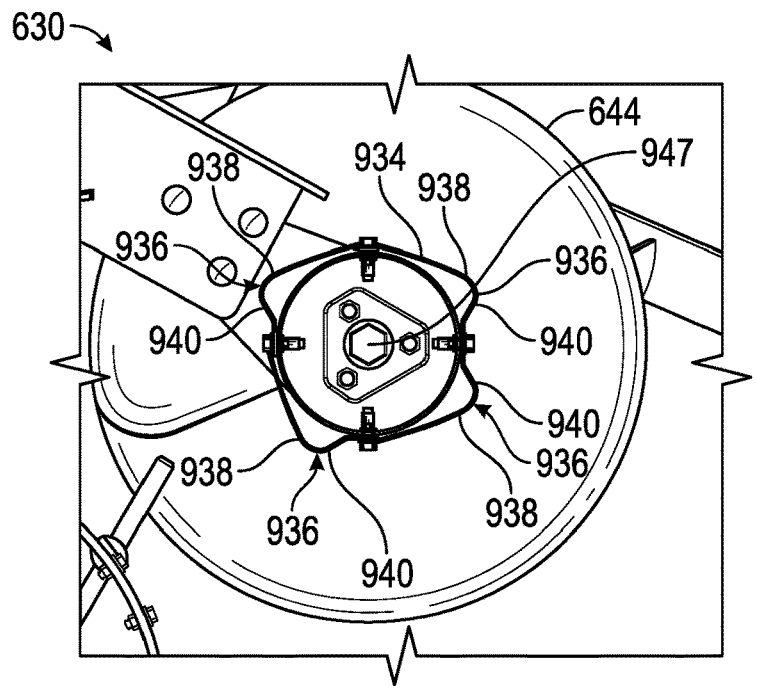
FIG. 27 is a sectional view of portions of the example draper platform of FIG. 25.

FIGS. 25-29 illustrate crop driver 932 removably mounted to support 800 of draper platform 630. Similar to crop driver 902, crop driver 932 is formed by multiple plates 934 removably mounted to the exterior of support 800 by fasteners 906. Unlike crop driver 902, crop driver 902 has an outer profile or cross-sectional shape that is asymmetric with respect to the rotational axis of support 800. As shown by FIG. 26, crop driver 932 has a plurality of outwardly projecting protuberances 936 with each protuberance having a flatter, less sharp or more gradually sloping side 938 and a sharper or steeper side 940.

Figure 28:
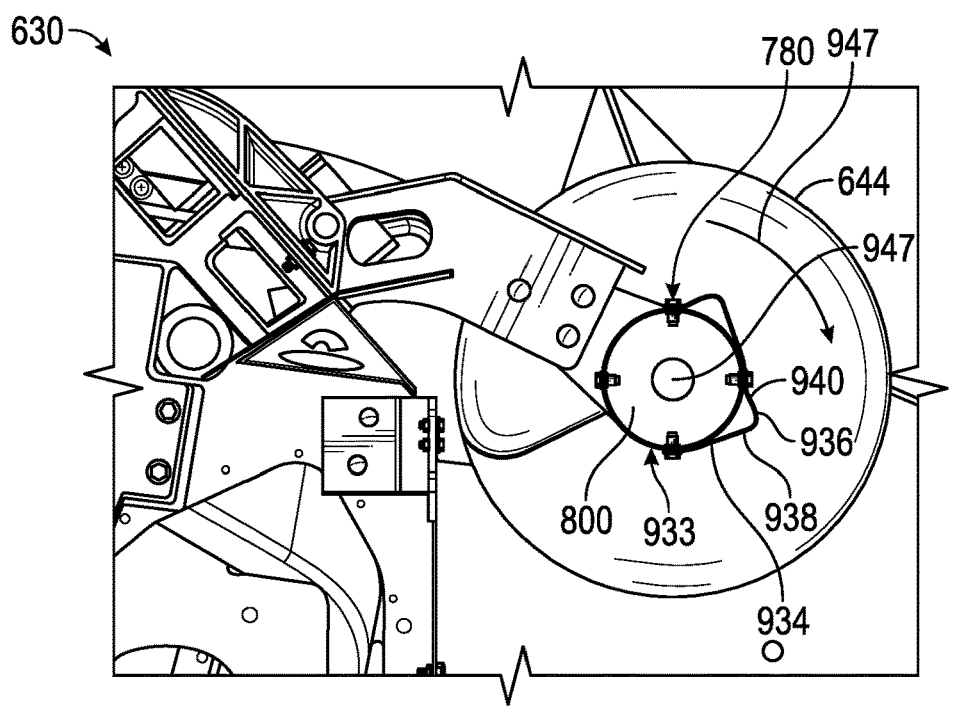
FIG. 28 is a sectional view of portions of the example draper platform of FIG. 25 with a crop driver removably mounted to a central roller baffle support in a first orientation.
Figure 29:
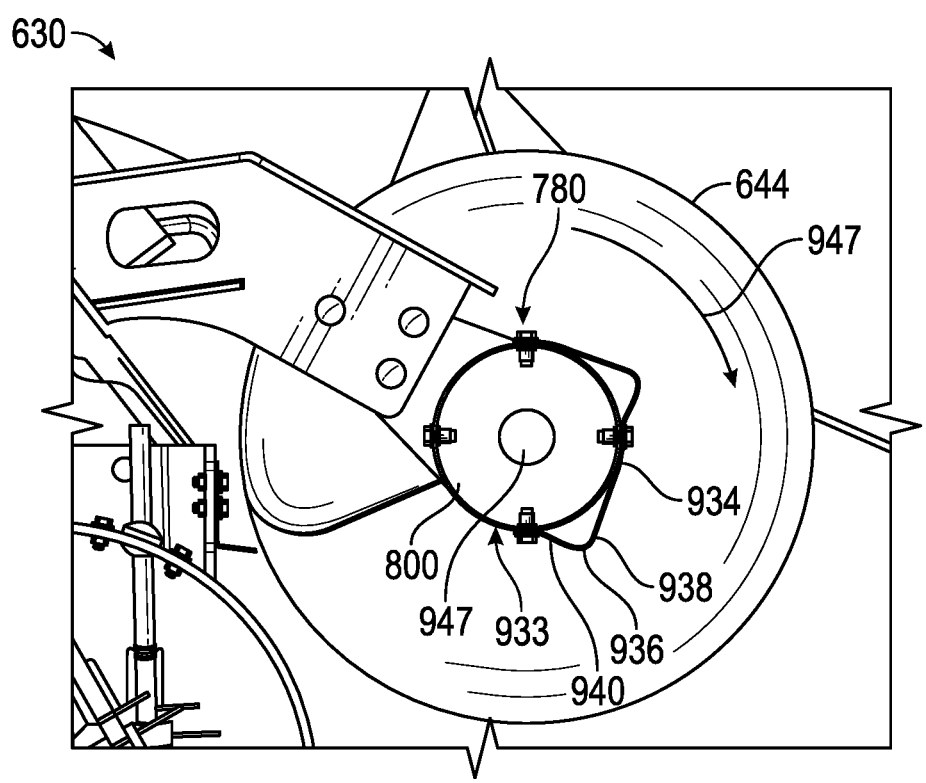
FIG. 29 is a sectional view of portions of the example draper platform of FIG. 28 with a crop driver removably mounted to the central roller baffle support in a second orientation.

FIGS. 28 and 29 illustrate draper platform 630 with crop driver 933 the slightly different configuration of plates 934. Each of the plates 934 have mounting openings that align with corresponding mounting openings in support 800 regardless of the orientation of such plates with respect to support 800. For example, each of plates 934 may be mounted to support 800, using the provided mounting holes such that the flatter side 938 becomes the leading edge, facing in a clockwise direction with respect axis 947 as seen in FIG. 28. Alternatively, each of plates 934 may be mounted to support 800 using the provided mounting holes such that the sharper side 940 becomes a leading-edge, facing in the clockwise direction with respect axis 947 as seen in FIG. 29. The same edges of plates 934 may face either leftward or rightward while being mounted on support 800.

As shown by FIG. 28, when central roller baffle 780 is being rotationally driven in the direction indicated by arrows 947, the less aggressive flatter sides 938 serve as a leading-edge to engage and drive the crop. As shown by FIG. 29, when central baffle roller 780 is being rotationally driven in the direction indicated by arrows 947, the more aggressive sharper sides 940 serve as a leading-edge to engage and drive the crop. As a result, the degree of aggressiveness provided by baffle 780 may be adjusted by the operator simply on fastening plates 934 and remounting the same plates 934 to support 800 in a different orientation, 180° flipped.

Figure 30:
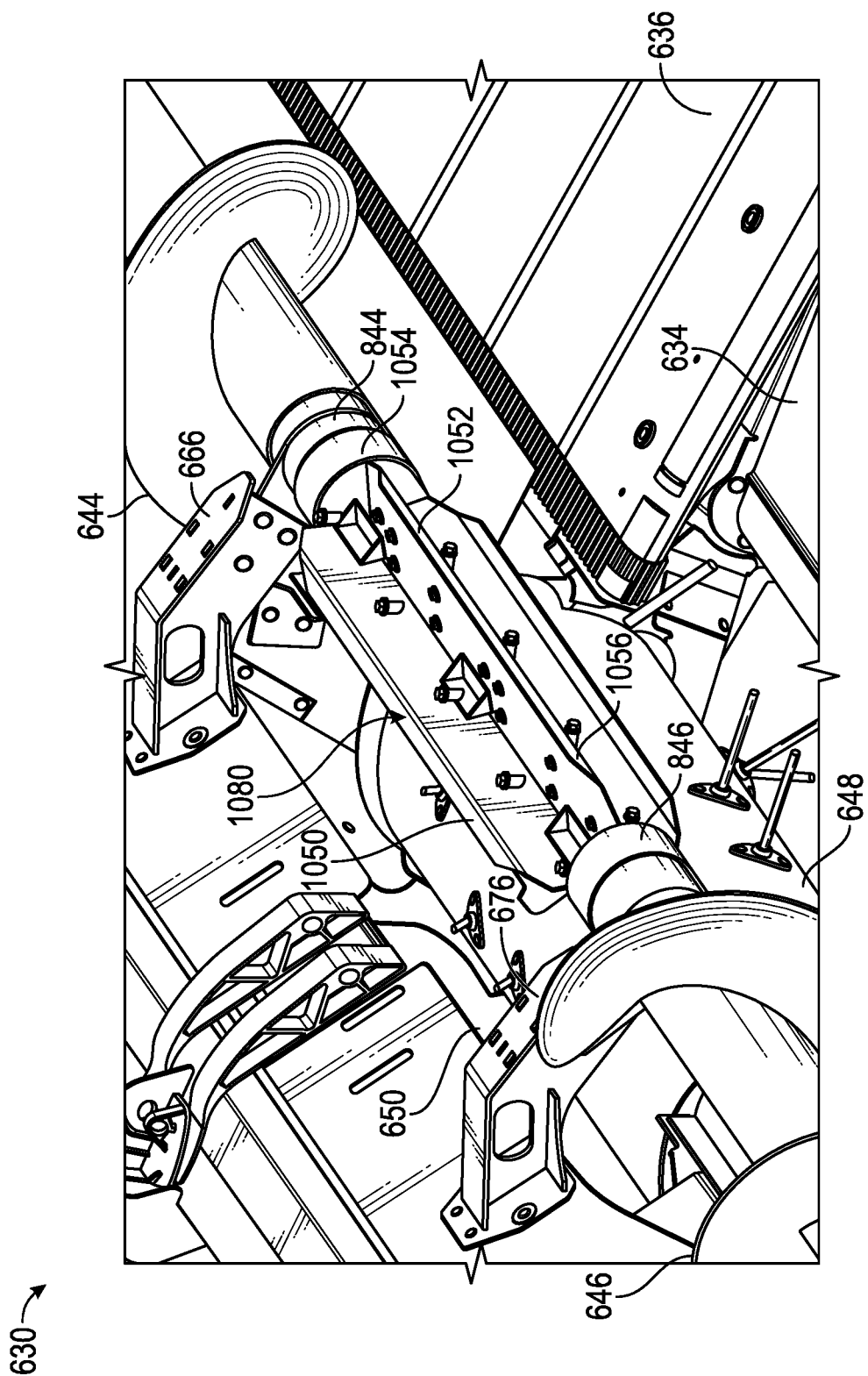
FIG. 30 is a perspective view of portions of the example draper platform of FIG. 10 with another example central roller baffle removably mounted between top cross augers.

FIG. 30 illustrates central roller baffle 1080 removably mounted between augers 644 and 646 of draper support 630, in place of an of the above described roller baffles or other roller baffles. Central roller baffle 1080 is similar to central roller baffle 780 except that central roller baffle 1080 comprises an arrangement of panels that are coupled to augur 644 and 646 by couplers 784 and 786 described above. In the example illustrated, central roller baffle 1080 comprises a primary panel 1050, secondary panels 1052 (only one of which is shown) an end panels 1054 (one of which is shown).

Primary panel 1050 extends along a majority the length of baffle 1080. Secondary panels 1052 extend from opposite sides or faces of 1050. In the example illustrated, secondary panels 1052 perpendicularly extend from the opposite side faces of primary panel 1050, opposite to one another, providing central roller baffle 1080 with a "+" shape. In the example illustrated, secondary panels 1052 are fastened to primary panel 1050. In other implementations, secondary panels 1052 may be welded or bonded to primary panel 1050. In some implementations, secondary panels 1052 may be integrally formed as a single unitary body with primary panel 1050. In the example illustrated, each of panels 1050, 1052 comprises a band edge 1056 further assist in gathering and driving crop.

End panels 1054 extended opposite axial ends of panels 1050, 1052. End panels 1054 comprise circular flat plates fastened, bonded or welded to the edges of the opposite ends of panels 1050, 1052. And panels 1054 facilitates securement of couplers 784, 786, described above. Although central roller baffle 1080 illustrated as having four blades angry spaced from one another by 90° about the rotational axis of baffle 1080, other central roller baffles 1080 may alternatively include other arrangements and numbers of blades. For example, another roller baffle 1080 may include three such blades angry spaced 180° apart from one another. Another roller baffle 1080 may include six blades angry spaced 30° apart from one another. Draper platform 630 facilitates the removal of one central roller baffle 1080 having a first arrangement of blades and replacement with another central roller baffle 1080 having a different arrangement or number of blades. In addition, draper platform 630 further facilitates the replacement of roller baffle 1080 with any of the above described roller baffles, depending upon the degree of aggressiveness desired for the roller baffle.

Figure 31:
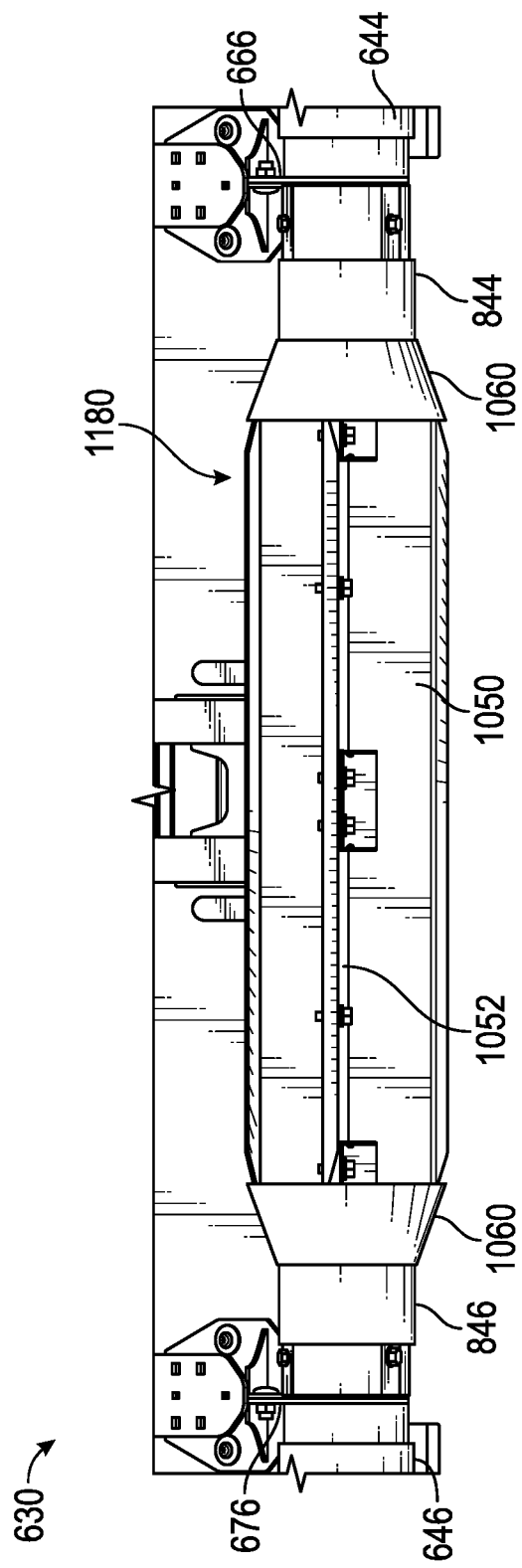
FIG. 31 is a top view of portions of the example draper platform of FIG. 10 with another example central roller baffle movably mounted between top cross augers.

FIG. 31 is a side view of another example roller baffle 1180. Roller baffle 1180 is similar to roller baffle 1080 except the roller baffle 1180 additionally comprises conical wrap guard extensions 1060. Wrap guard extensions 1060 extend from wrap guards 844 and 846, projecting over the axial ends of panels 1050, 1052. Wrap guard extensions 1060 further assist in inhibiting the laughing or collection of crop material about baffle 1180 as baffle 1180 is being rotationally driven.

Although the present disclosure has been described with reference to example implementations, workers skilled in the art will recognize that changes may be made in form and detail without departing from the spirit and scope of the claimed subject matter. For example, although different example implementations may have been described as including one or more features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. A draper platform for mounting on a feeder house of an agricultural combine, the draper platform comprising:
    a frame;
    a center belt conveyor to carry cut crop material rearwardly towards a center opening in the frame through which crop may be fed into a feeder house;
    a left side belt conveyor to carry cut crop material to the center belt conveyor;
    a right side belt conveyor to carry cut crop material to the center belt conveyor;
    at least one elongate reciprocating knife assembly extending along a front edge of each of the center belt conveyor, the left side belt conveyor and the right side belt conveyor;
    a left side top cross auger above the left side belt conveyor, the left side top cross auger having a right inner end;
    a right side top cross auger above the right side belt conveyor, the right side top cross auger having a left inner end opposite to and spaced from the right inner end; and
    a conveyor drum above the center belt conveyor and underlying a space sandwiched between the right inner end and the left inner end.

2. The draper platform of claim 1 further comprising a central roller baffle detachably mounted directly above and overlying the conveyor drum, the central roller baffle being sandwiched between and removably connected to each of the left side top cross auger and the right side top cross auger.

3. The draper platform of claim 2, wherein the central roller baffle and the right side top cross auger are coaxial.

4. The draper platform of claim 2, wherein the central roller baffle is rotatable about a first axis and wherein the right side top cross auger and the left side top cross auger are rotatable about a second axis parallel to and offset from the first axis.

5. The draper platform of claim 2 further comprising a torque coupler releasably connecting the central roller baffle to one of the left side top cross auger and the right side top cross auger to transmit torque to the central roller baffle to rotatably drive the central roller baffle.

6. The draper platform of claim 5, wherein the torque coupler comprises:
    a first externally threaded shaft coupled to one of the central roller baffle and said one of the left side top cross and the right side top cross auger; and
    a second internally threaded member receiving the first externally threaded shaft, the second internally threaded member being coupled to the other of the central roller and said one of the left side top cross auger and the right side top cross auger.

7. The draper platform of claim 5 further comprising a bearing coupler connecting the central roller baffle to the other of the left side top cross auger and the right side top cross auger and supporting the central roller baffle for relative rotation with respect to the other of the left side top cross auger and the right side top cross auger.

8. The draper platform of claim 2 further comprising:
    a first coupling arrangement releasably interconnecting the left top cross auger and the central roller baffle; and
    a second coupling arrangement releasably interconnecting the right top cross auger and the central roller baffle.

9. The draper platform of claim 2 further comprising:
    a first wrap guard between the left top cross auger and the central roller baffle, the first wrap guard enclosing the first coupling arrangement; and
    a second wrap guard between the right top cross auger and the central roller baffle, the second wrap guard enclosing the second coupling arrangement.

10. The draper platform of claim 2, wherein the central roller baffle comprises:
    a first panel having a first side and a second side, the first panel intersecting a rotational axis of the central roller baffle;
    a second panel extending from the first side nonparallel to the first panel; and
    a third panel extending from the second side nonparallel to the first panel.

11. The draper platform of claim 2, wherein the central roller baffle comprises:
    a cylinder extending about a rotational axis of the central roller baffle; and
    at least one plate removably mounted to an exterior of the cylinder.

12. The draper platform of claim 2, wherein the first top cross auger and the second top cross auger have first crop movers to move crop in directions along a rotational axis of the first top cross auger and the second top cross auger and wherein the central cross baffle comprises second crop movers to move crop in a direction perpendicular to a rotational axis of the central roller baffle.

13. The draper platform of claim 1 further comprising:
    a first rotary drive operably coupled to the left side top cross auger to rotatably drive the left side top cross auger; and
    a second rotary drive operably coupled to the right side top cross auger to rotatably drive the right side top cross auger.

14. A draper platform for mounting on a feeder house of an agricultural combine, the draper platform comprising:
    a frame;
    a center belt conveyor to carry cut crop material rearwardly towards a center opening in the frame through which crop may be fed into a feeder house;
    a left side belt conveyor to carry cut crop material to the center belt conveyor;
    a right side belt conveyor to carry cut crop material to the center belt conveyor;
    at least one elongate reciprocating knife assembly extending along a front edge of each of the center belt conveyor, the left side belt conveyor and the right side belt conveyor;
    a left side top cross auger above the left side belt conveyor, the left side top cross auger having a right inner end;
    a right side top cross auger above the right side belt conveyor, the right side top cross auger having a left inner end opposite to and spaced from the right inner end;
    a conveyor drum above the center belt conveyor below a space between the right inner end and the left inner end;
    a first rotary drive operably coupled to the left side top cross auger to rotatably drive the left side top cross auger; and
        a second rotary drive operably coupled to the right side top cross auger to rotatably drive the right side top cross auger.

15. The draper platform of claim 14 further comprising a central roller baffle detachably mounted directly above and overlying the conveyor drum, the central roller baffle being sandwiched between and removably connected to each of the left side top cross auger and the right side top cross auger.

16. The draper platform of claim 15 further comprising:
a torque coupler releasably connecting the central roller baffle to one of the left side top cross auger and the right side top cross auger to transmit torque to the central roller baffle to rotatably drive the central roller baffle; and
a bearing coupler connecting the central roller baffle to the other of the left side top cross auger and the right side top cross auger and supporting the central roller baffle for relative rotation with respect to the other of the left side top cross auger and the right side top cross auger.

17. A draper platform for mounting on a feeder house of an agricultural combine, the draper platform comprising:
a frame;
a center belt conveyor to carry cut crop material rearwardly towards a center opening in the frame through which crop may be fed into a feeder house;
a left side belt conveyor to carry cut crop material to the center belt conveyor;
a right side belt conveyor to carry cut crop material to the center belt conveyor;
at least one elongate reciprocating knife assembly extending along a front edge of each of the center belt conveyor, the left side belt conveyor and the right side belt conveyor;
a left side top cross auger above the left side belt conveyor, the left side top cross auger having a right inner end;
a right side top cross auger above the right side belt conveyor, the right side top cross auger having a left inner end opposite to and spaced from the right inner end;
a conveyor drum above the center belt conveyor below a space between the right inner end and the left inner end;
a central roller baffle detachably mounted directly above and overlying the conveyor drum, the central roller baffle being sandwiched between and removably connected to each of the left side top cross auger and the right side top cross auger, wherein the central roller baffle comprises:
a first panel having a first side and a second side, the first panel intersecting a rotational axis of the central roller baffle;
a second panel extending from the first side nonparallel to the first panel; and
a third panel extending from the second side nonparallel to the first panel.

* * * * *